US011305929B2

(12) United States Patent
McDaniel et al.

(10) Patent No.: US 11,305,929 B2
(45) Date of Patent: Apr. 19, 2022

(54) INFLATABLE CELLULAR WEB WITH MULTIPLE INFLATABLE PANELS

(71) Applicant: Sealed Air Corporation (US), Charlotte, NC (US)

(72) Inventors: Ricky D. McDaniel, Harrisburg, NC (US); Robert J. O'Dowd, Denver, NC (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 17/293,315

(22) PCT Filed: Nov. 13, 2019

(86) PCT No.: PCT/US2019/061067
§ 371 (c)(1),
(2) Date: May 12, 2021

(87) PCT Pub. No.: WO2020/102272
PCT Pub. Date: May 22, 2020

(65) Prior Publication Data

US 2021/0354898 A1 Nov. 18, 2021

Related U.S. Application Data

(60) Provisional application No. 62/760,968, filed on Nov. 14, 2018.

(51) Int. Cl.
*B29D 22/02* (2006.01)
*B65D 81/05* (2006.01)
(Continued)

(52) U.S. Cl.
CPC ......... *B65D 81/052* (2013.01); *B31D 5/0073* (2013.01); *B65D 75/20* (2013.01);
(Continued)

(58) Field of Classification Search
CPC ..................................................... B29D 22/02
See application file for complete search history.

(56) References Cited

U.S. PATENT DOCUMENTS 4,551,379 A 11/1985 Kerr
6,800,162 B2 10/2004 Kannankeril et al.
(Continued)

OTHER PUBLICATIONS

Written Opinion of the International searching authority in PCT/US2019/061067 dated May 22, 2020.

*Primary Examiner* — Praachi M Pathak
(74) *Attorney, Agent, or Firm* — Jon M. Isaacson

(57) ABSTRACT

An inflatable web includes an inflation zone, a first inflatable panel in fluid communication with the inflation zone, and a second inflatable panel in fluid communication with the inflation zone. The first inflatable panel includes a first sheet juxtaposed on a second sheet. The first and second sheets are sealed together to form inflatable chambers. The second inflatable panel include a third sheet juxtaposed on a fourth sheet. The third and fourth sheets are sealed together to form inflatable chambers. The inflatable film is configured to be inflated by an inflation and sealing machine configured to direct gas into the inflatable chambers of the first and second inflatable panels via the inflation zone and to individually seal the inflatable chambers of the first and second inflatable panels.

23 Claims, 11 Drawing Sheets

(51) Int. Cl.

| | |
|---|---|
| ***B65D 81/03*** | (2006.01) |
| ***B65D 75/20*** | (2006.01) |
| ***B31D 5/00*** | (2017.01) |
| ***B65D 75/52*** | (2006.01) |

(52) U.S. Cl.
CPC ........... *B65D 75/527* (2013.01); *B65D 81/03* (2013.01); *B31D 2205/0023* (2013.01); *B31D 2205/0064* (2013.01)

(56) References Cited

U.S. PATENT DOCUMENTS

| | | | |
|---|---|---|---|
| 7,225,599 | B2 | 6/2007 | Sperry et al. |
| 7,551,379 | B2 | 6/2009 | Yu et al. |
| 7,721,781 | B2 | 5/2010 | Sperry et al. |
| 8,978,345 | B2 | 3/2015 | Sperry |
| 9,662,852 | B2 * | 5/2017 | Nagata .................... B31B 70/64 |
| 9,969,136 | B2 * | 5/2018 | Lepine ................. B31D 5/0073 |
| 10,786,960 | B2 * | 9/2020 | Sperry ................... B65D 81/03 |
| 2002/0166788 | A1 | 11/2002 | Sperry et al. |
| 2007/0011989 | A1 | 1/2007 | Sperry et al. |
| 2010/0251665 | A1 | 10/2010 | Sperry |
| 2015/0075114 | A1 | 3/2015 | Murch et al. |
| 2016/0064277 | A1 | 3/2016 | Park et al. |

* cited by examiner

INFLATABLE CELLULAR WEB WITH MULTIPLE INFLATABLE PANELS

BACKGROUND

The present disclosure is in the technical field of inflatable webs. More particularly, the present disclosure is directed to inflatable webs that have multiple inflatable panels in fluid communication with a common inflation zone.

Air cellular cushioning articles suitable for packaging applications have been in commercial use for several decades. One of the products in widespread use is Bubble-Wrap® cellular cushioning, one embodiment of which is made by using heat and vacuum to form spaced-apart, air-filled cavities in a first film and thereafter heat sealing a flat second "backing" film to the flats between the cavities of the first film, so that air is entrapped in the formed cavities making up the individualized cells. The resulting air-cellular cushioning product comprises discrete closed bubbles. If any one bubble bursts, no other bubble necessarily deflates. One significant disadvantage of BubbleWrap® cellular cushioning product is that shipping costs are high per unit weight of product because the product density is low (i.e., most of the volume such products is air).

Although Bubble Wrap® cushioning products have not been displaced by inflatable flexible cushioning articles, in the past there have been a number of commercialized air-cellular cushioning products for packaging which have been designed to be inflated by the end user, i.e., inflated and sealed shut immediately before end use by the packager. These products offer the advantage of being shippable before inflation, providing for much more efficient transport and storage before use, as any given volume within a truck or warehouse can hold over thirty times as much product if it is uninflated rather than shipped to the packager while inflated.

These "inflatable" cellular packaging products include inflatable sheets of air cellular material (e.g., U.S. Pat. No. 7,721,781, the contents of which are hereby incorporated by reference in their entirety), inflatable "pouches" of air cellular material (e.g., U.S. Pat. No. 9,969,136, the contents of which are hereby incorporated by reference in their entirety), and other forms of air cellular material. These inflatable cellular cushioning materials typically have a plurality of chambers extending from a fill zone, with each of the chambers containing a series of interconnected inflatable "cells" (e.g., inflatable "bubbles"), with each series of cells extending transversely across the web. Air within one of the cells of a particular series can freely move within other cells of the same series.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, an inflatable web includes an inflation zone, a first inflatable panel, and a second inflatable panel. The inflation zone is bound in part by flanges. The first inflatable panel is in fluid communication with the inflation zone. The first inflatable panel includes a first sheet juxtaposed on a second sheet. The first and second sheets are sealed together to form a first plurality of inflatable chambers. The second inflatable panel is in fluid communication with the inflation zone. The second inflatable panel include a third sheet juxtaposed on a fourth sheet. The third and fourth sheets are sealed together to form a second plurality of inflatable chambers. The inflatable web is configured to be inflated by an inflation and sealing machine configured to direct gas into the first plurality of inflatable chambers and the second plurality of inflatable chambers via the inflation zone and to individually seal the first plurality of inflatable chambers and the second plurality of inflatable chambers.

In a second embodiment, the flanges of the first embodiment are connected to each other so that the inflation zone is closed.

In a third embodiment, the flanges of the first embodiment are not connected directly to each other so that the inflation zone is open.

In a fourth embodiment, the first plurality of inflatable chambers of any of the previous embodiments includes inflatable chambers each having inflatable cells.

In a fifth embodiment, the inflatable cells of the fourth embodiment have a shape that is substantially circular.

In a sixth embodiment, the first plurality of inflatable chambers of any of the previous embodiments is fluidly coupled to the inflation zone via first inflation ports and the second plurality of inflatable chambers of any of the previous embodiments is fluidly coupled to the inflation zone via second inflation ports.

In a seventh embodiment, the inflatable web of the sixth embodiment further includes a first line of weakness in the first inflation panel above the first inflation ports and a second line of weakness in the second inflation panel above the second inflation ports.

In an eighth embodiment, after inflation of the inflatable web of the seventh embodiment, the inflatable web is configured to be broken at the first and second lines of weakness to form two separate inflated panels.

In a ninth embodiment, the inflatable web of any of the previous embodiments includes a third line of weakness between the second sheet of the first inflatable panel and the third sheet of the second inflatable panel.

In a tenth embodiment, the inflatable web of the ninth embodiment further includes a seal near longitudinal edges of the first and second inflatable panels.

In an eleventh embodiment, the third line of weakness of the tenth embodiment can be broken to permit an object to be inserted between the first and second inflatable panels above the seal near the longitudinal edges of the first and second inflatable panels.

In a twelfth embodiment, the inflatable web of any of the previous embodiments is configured to be wound into a supply roll with the inflation zone on a longitudinal side of the supply roll and the first and second inflatable panels overlapping each other.

In a thirteenth embodiment, the first and second inflatable panels of the twelfth embodiment, after inflation by the inflation and sealing apparatus, are configured to be unfolded to a width that is greater than a width of the supply roll.

In a fourteenth embodiment, the first and second sheets of any of the previous embodiments are formed from a single sheet that is folded onto itself between the first and second sheets.

In a fifteenth embodiment, the third and fourth sheets of any of the previous embodiments are formed from a single sheet that is folded onto itself between the third and fourth sheets.

In a sixteenth embodiment, the first, second, third, and fourth sheets of any of the previous embodiments are formed from a single sheet folded onto itself multiple times so that a heat sealable surface of the single sheet faces inward between the first and second sheets, the heat sealable surface of the single sheet faces inward between the third and fourth sheets, and an exterior surface of the single sheet faces inward between the second and third sheets.

In a seventeenth embodiment, a length of the first sheet is substantially similar to a length of the fourth sheet in of any of the previous embodiments.

In an eighteenth embodiment, a combined length of the first sheet and the fourth sheet is substantially similar to a combined length of the second sheet and the third sheet of any of the previous embodiments.

In a nineteenth embodiment, the second sheet and the third sheet of the eighteenth embodiment are formed from a single sheet that is folded back on itself at least once so that the second and third sheets do not extend as far as the first and fourth sheets.

In a twentieth embodiment, the inflatable web of any of the previous embodiments is arranged such that the first inflatable panel includes a first flap that extends from distal ends of the first plurality of inflatable chambers to a longitudinal edge of the first inflatable panel and the second inflatable panel includes a second flap that extends from distal ends of the second plurality of inflatable chambers to a longitudinal edge of the second inflatable panel.

In a twenty first embodiment, the inflatable web of the twentieth embodiment further includes a closure mechanism configured to couple the first and second flaps to each other.

In a twenty second embodiment, the closure mechanism of the twenty first embodiment includes an adhesive layer on an inner side of the first flap, and wherein the adhesive layer is configured to contact and adhere to an outer side of the second layer.

In a twenty third embodiment, the inflatable web of the twenty first embodiment is configured to be wound into a supply roll with the inflation zone on a first longitudinal side of the supply roll, the first and second inflatable panels overlapping each other, and the closure mechanism on a second longitudinal side of the supply roll. The first longitudinal side of the supply roll is on one side of the supply roll and the second longitudinal side of the supply roll is on another side of the supply roll.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 11A to 110 depict an embodiment of forming an inflatable web from two sheets having substantially similar transverse lengths, in accordance with the embodiments described herein.

DETAILED DESCRIPTION

The present disclosure describes embodiments of inflatable webs that have a common inflation zone and more than one inflatable panel of air cellular material extending away from the common inflation zone. The arrangement of the inflatable web allows the web, after inflation, to be used in a number of different ways. For example, each of the multiple inflatable panels can be separated from each other so that multiple inflated sheets are formed as the inflatable web passes through an inflation and sealing machine. In another example, two of the inflatable panels can remain connected after inflation to form an inflated sheet that is twice as wide as a single inflatable panel. In another example, two of the inflatable panels can remain connected in an overlapping configuration to form an inflated pouch. Such an inflated web with multiple inflated panels can be used in other ways beyond those examples provided here.

Figure 1:
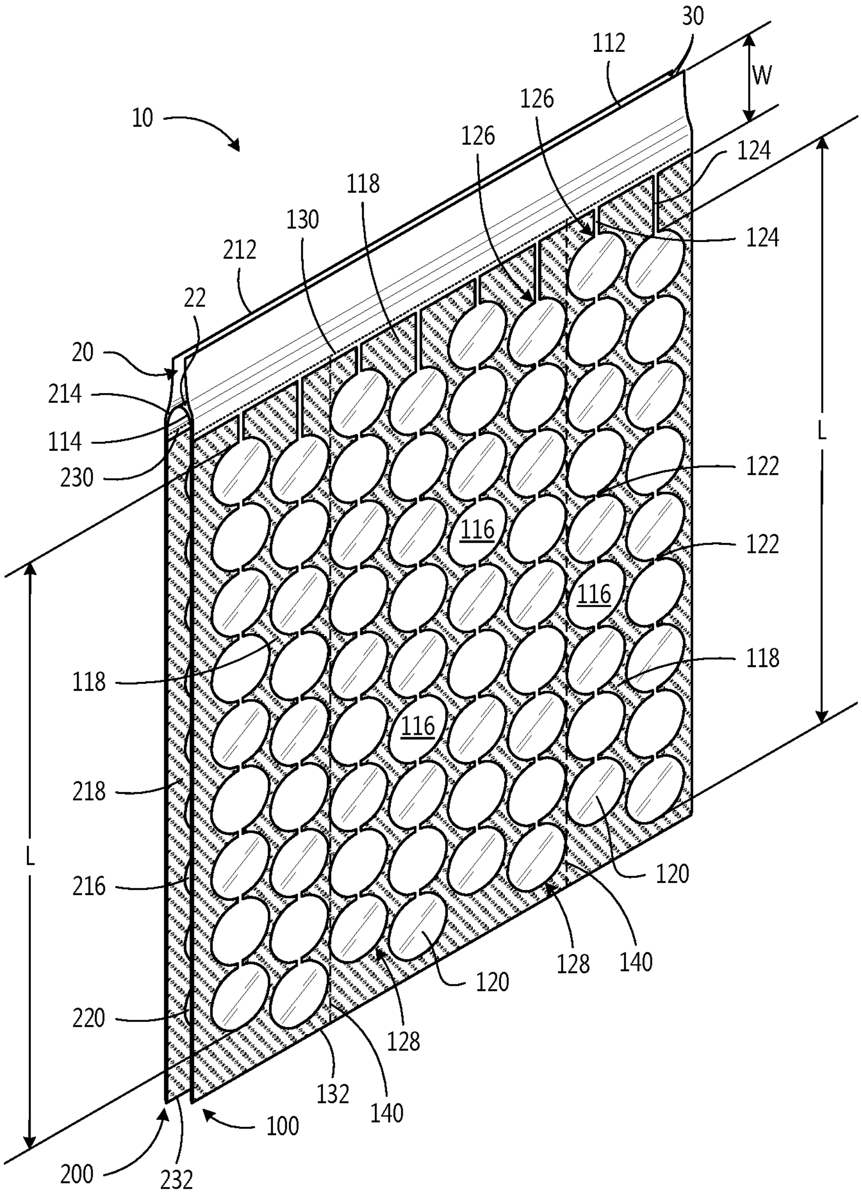
FIG. 1 depicts a perspective view of an embodiment of an inflatable web, in accordance with the embodiments described herein.
Figure 2A:
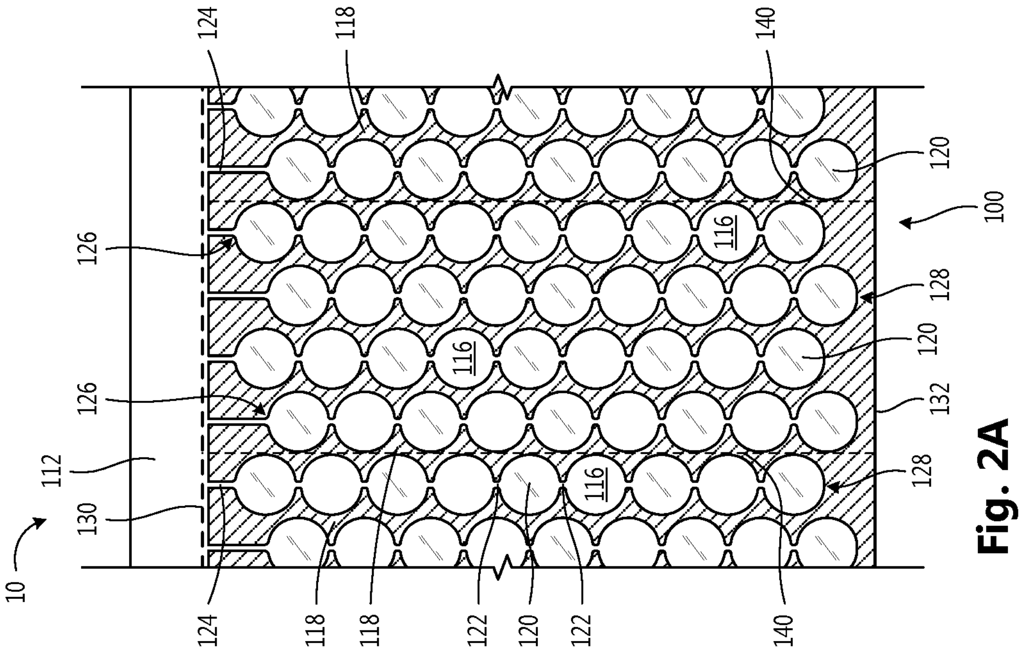
FIGS. 2A, 2B, and 2C depict front, right side, and back views, respectively, of a portion of the inflatable web shown in FIG. 1, in accordance with the embodiments described herein.
Figure 2B:
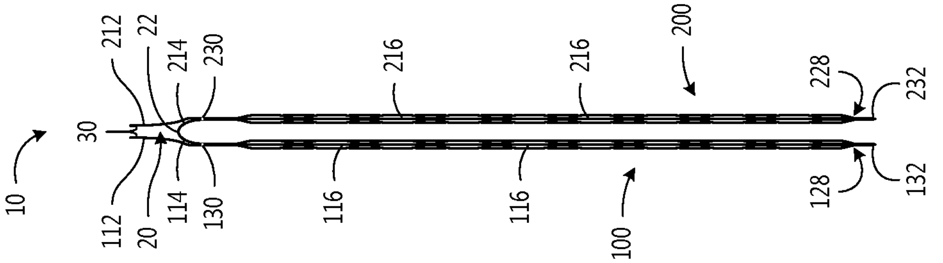
Figure 2C:
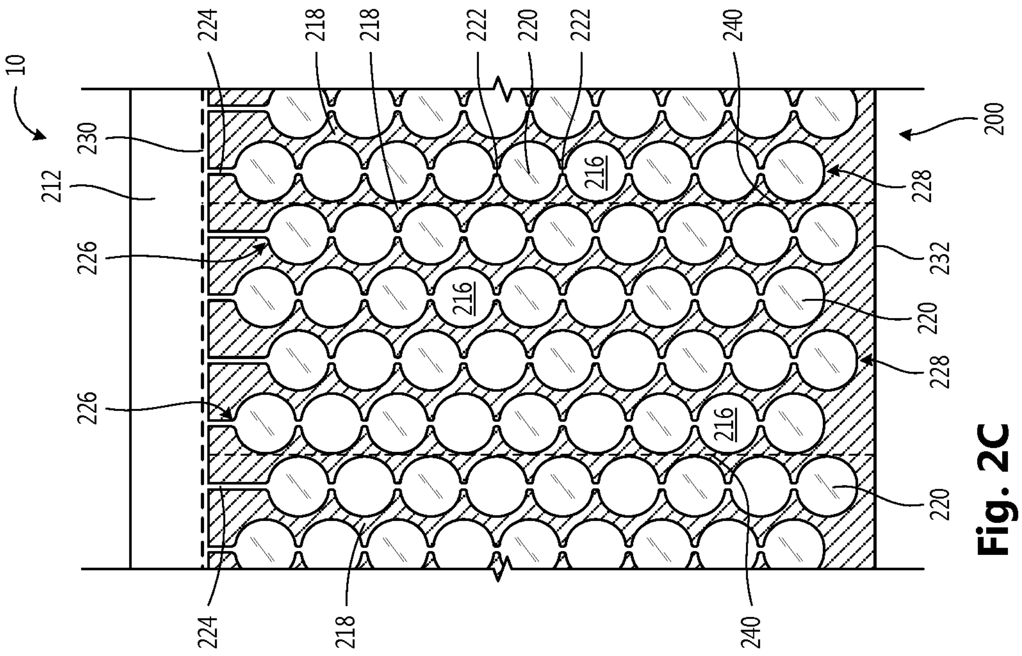

FIG. 1 depicts a perspective view of an embodiment of an inflatable web 10. FIGS. 2A, 2B, and 2C depict front, right side, and back views, respectively, of a portion of the inflatable web 10. The inflatable web 10 includes an inflation zone 20 that is bounded by flanges 30 on the front and back of the inflatable web 10. In the depicted embodiment, the inflation zone 20 is “open” because the flanges 30 do not meet at the top of the inflatable web 10. The inflatable web 10 includes an inflatable panel 100 and an inflatable panel 200. Each of the inflatable panels 100 and 200 is in fluid communication with the inflation zone 20 such that a fluid, such as a gas (e.g., air), can pass through inflation zone 20 into both of the inflatable panels 100 and 200.

The inflatable panel 100 includes a sheet 112 and a sheet 114. The sheets 112 and 114 have respective inner surfaces that are sealed to each other in a pattern that defined a series of inflatable chambers 116. In the depicted embodiment, the inflatable chambers 116 have a length L between proximal ends 126 and distal ends 128 that is substantially the same for each of the inflatable chambers. In other embodiments, the length of the inflatable chambers may have different lengths. In the depicted embodiment, adjacent ones of the inflatable chambers 116 are offset from each other to enable the inflatable chambers 116 to be arranged in close proximity to each other. The sheets 112 and 114 are sealed to each other by seals 118 that define the inflatable chambers 116. In the depicted embodiment, the inflatable chambers 116 are shaped to have a series of cells 120 and passageways 122. In some embodiments, the cells 120 have a larger width than the passageways 122. In the depicted embodiment, the cells 120 have a generally circular shape such that, after the cells 120 are inflated, the cells 120 would have a three-dimensional "bubble" shape. In other embodiments, the cells 120 may have other shapes. The seals 118 also define inflation ports 124. Each of the inflation ports 124 permits fluid, such as gas (e.g., air), to pass from the inflation zone 20 into one of the inflatable chambers 116. The inflatable panel 100 also includes a longitudinal edge 132 that is opposite from the flanges 30.

The inflatable panel 200 includes a sheet 212 and a sheet 214. The sheets 212 and 214 have respective inner surfaces that are sealed to each other in a pattern that defined a series of inflatable chambers 216. In the depicted embodiment, the inflatable chambers 216 have a length L between proximal ends 226 and distal ends 228 that is substantially the same for each of the inflatable chambers. In other embodiments, the length of the inflatable chambers may have different lengths. In the depicted embodiment, adjacent ones of the inflatable chambers 216 are offset from each other to enable the inflatable chambers 216 to be arranged in close proximity to each other. The sheets 212 and 214 are sealed to each other by seals 218 that define the inflatable chambers 216. In the depicted embodiment, the inflatable chambers 216 are shaped to have a series of cells 220 and passageways 222. In some embodiments, the cells 220 have a larger width than the passageways 222. In the depicted embodiment, the cells 220 have a generally circular shape such that, after the cells 220 are inflated, the cells 220 would have a three-dimensional "bubble" shape. In other embodiments, the cells 220 may have other shapes. The seals 218 also define inflation ports 224. Each of the inflation ports 224 permits fluid, such as gas (e.g., air), to pass from the inflation zone 20 into one of the inflatable chambers 216. The inflatable panel 200 also includes a longitudinal edge 232 that is opposite from the flanges 30.

In the depicted embodiment, the flanges 30 are formed by a portion of each of the sheets 112 and 212. In particular, one of the flanges 30 is formed by a portion of the sheet 112 that extends beyond the inflation ports 124 and the other of the flanges 30 is formed by a portion of the sheet 212 that extends by beyond the inflation ports 224. In the depicted embodiment, the flanges 30 extend out a substantially equal distance beyond inflation ports 124 and 224. The flanges 30 accordingly have equivalent widths, shown as width W. The flanges 30, in conjunction with inflation ports 124 and 224 and the seals 118 and 218, constitute the inflation zone 20 in inflatable web 10 that is advantageously configured to provide rapid and reliable inflation of the inflatable chambers 116 and 216. In some embodiments, the inner surfaces of the flanges 30 preferably are brought into close slidable contact with outwardly facing surfaces of an appropriately configured nozzle or other inflation means so as to provide a partially closed inflation zone which promotes efficient and reliable sequential inflation of inflatable chambers 116 without restricting the movement of the web or inflation nozzle that is required to effect this sequential inflation. In some embodiments, the flanges 30 are preferably at least 0.25 inches in width W and, more preferably, at least 0.5 inches in width. The flanges 30 may have different widths, but it is generally preferred that they are substantially equal in width, as shown in FIGS. 1 and 2A-2C.

In some embodiments, the seal patterns of seals 118 and 218 provide uninflatable planar regions between inflatable chambers 116 and 216, respectively. These planar regions serve as flexible junctions that may advantageously be used to bend or conform the inflated web about a product in order to provide optimal cushioning protection. In another embodiment, the seal patterns can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference. The seals 118 and 218 may be heat seals between the inner surfaces of the sheets 112 and 114 and between the inner surfaces of the sheets 212 and 214, respectively. Alternatively, sheets 112 and 114 may be adhesively bonded to each other and sheets 212 and 214 may be adhesively bonded to each other. Heat seals are preferred and, for brevity, the term "heat seal" is generally used hereinafter. This term should be understood, however, to include the formation of seals 118 by adhesion of sheets 112 and 114 and/or the formation of seals 218 by adhesion of sheets 212 and 214 as well as by heat sealing.

In some embodiments, the sheets 112, 114, 212, and 214 comprise a thermoplastic heat sealable polymer on their inner surface such that, after superposition of sheets 112 and 114 and superposition of sheets 212 and 214, inflatable web 10 can be formed by passing the superposed sheets beneath a sealing roller having heated raised land areas that correspond in shape to the desired pattern of seals 118 and 218. The sealing roller applies heat and forms the seals 118 between sheets 112 and 114 and the seals 218 between sheets 212 and 214 in the desired patterns, and thereby also forms inflatable chambers 116 and 216 with a desired shape. The sealing pattern on the sealing roller also provides intermittent seals at proximal ends 126, thus forming inflation ports 124, and at proximal ends 226, thus forming inflation ports 224, and also effectively resulting in the formation of the flanges 30. Further details concerning this manner of making the inflatable web 10 are disclosed in U.S. Pat. No. 6,800,162, the disclosure of which is hereby incorporated herein by reference in its entirety.

In some embodiments, the heat sealability of sheets 112, 114, 212, and 214 can be provided by employing a monolayer sheet comprising a heat sealable polymer or a multilayer sheet comprising an inner layer comprising a heat sealable polymer. In either case, inflation ports 124 and 224 preferably also comprise inner surfaces that are heat sealable to one another to allow such ports to be closed by heat sealing means after inflation of a corresponding chamber.

In some embodiments, the sheets 112, 114, 212, and 214 may initially be separate sheets that are brought into superposition and sealed. In these embodiments, the longitudinal edge 132 is formed by sealing the individual sheets 112 and 114 as part of the pattern of seals 118 and the longitudinal edge 232 is formed by sealing the individual sheets 212 and 214 as part of the pattern of seals 218. In some embodiments, any combination of two or more of the sheets 112, 114, 212, and 214 may be formed by folding a single sheet onto itself. In one example, the sheets 112 and 114 may be formed by a single sheet that is folded with the heat sealable surface of the single sheet facing inward. The fold in the single sheet forms the longitudinal edge 132 of the inflatable panel 100 that is opposite from the flanges 30. In another example, the sheets 212 and 214 may be formed by a single sheet that is folded with the heat sealable surface of the single sheet facing inward. The fold in the single sheet forms the longitudinal edge 232 of the inflatable panel 200 that is opposite from the flanges 30. In some embodiments, all of the sheets 112, 114, 212, and 214 are formed from a single sheet where by folding a single sheet onto itself multiple times so that the heat sealable surface of the single sheet faces inward between the sheets 112 and 114 and between the sheets 212 and 214 and so that the exterior surface (e.g., non-heat-sealable surface) of the single sheet faces inward between the sheets 114 and 214.

In general, the sheets 112, 114, 212, and 214 may comprise any flexible material that can be manipulated to enclose a gas in inflatable chambers 116 and 216 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

In the depicted embodiment, the inflatable web 10 includes lines of weakness that facilitate the tearing of portions of the inflatable web 10. As used herein the term "line of weakness" includes any type of cut, puncture, score, thinning, or other deformation of the film that reduces the amount of force require to tear the film at that location. In the depicted embodiment, the inflatable web 10 includes three lines of weakness in the form of perforation lines. The inflatable web 10 includes a line of weakness 22 between the sheet 114 and the sheet 214. As discussed in greater detail below, the line of weakness 22 may allow the inflatable web 10 to be broken, after it has been inflated, to form a pouch structure. The inflatable web 10 also includes a line of weakness 130 in the inflatable panel 100. The line of weakness 130 is a perforated line that passes through both the sheet 112 and the sheet 114 before the inflation ports 124. As discussed in greater detail below, after the inflatable web 10 is inflated, the inflatable web 10 can be broken at the line of weakness 130 to separate the inflatable panel 100 from the remainder of the inflatable web 10. The inflatable web 10 also includes a line of weakness 230 in the inflatable panel 200. The line of weakness 230 is a perforated line that passes through both the sheet 212 and the sheet 214 before the inflation ports 224. As discussed in greater detail below, after the inflatable web 10 is inflated, the inflated web can be broken at the line of weakness 230 to separate the inflated panel 200' from the remainder of the inflatable web 10.

Figure 3:
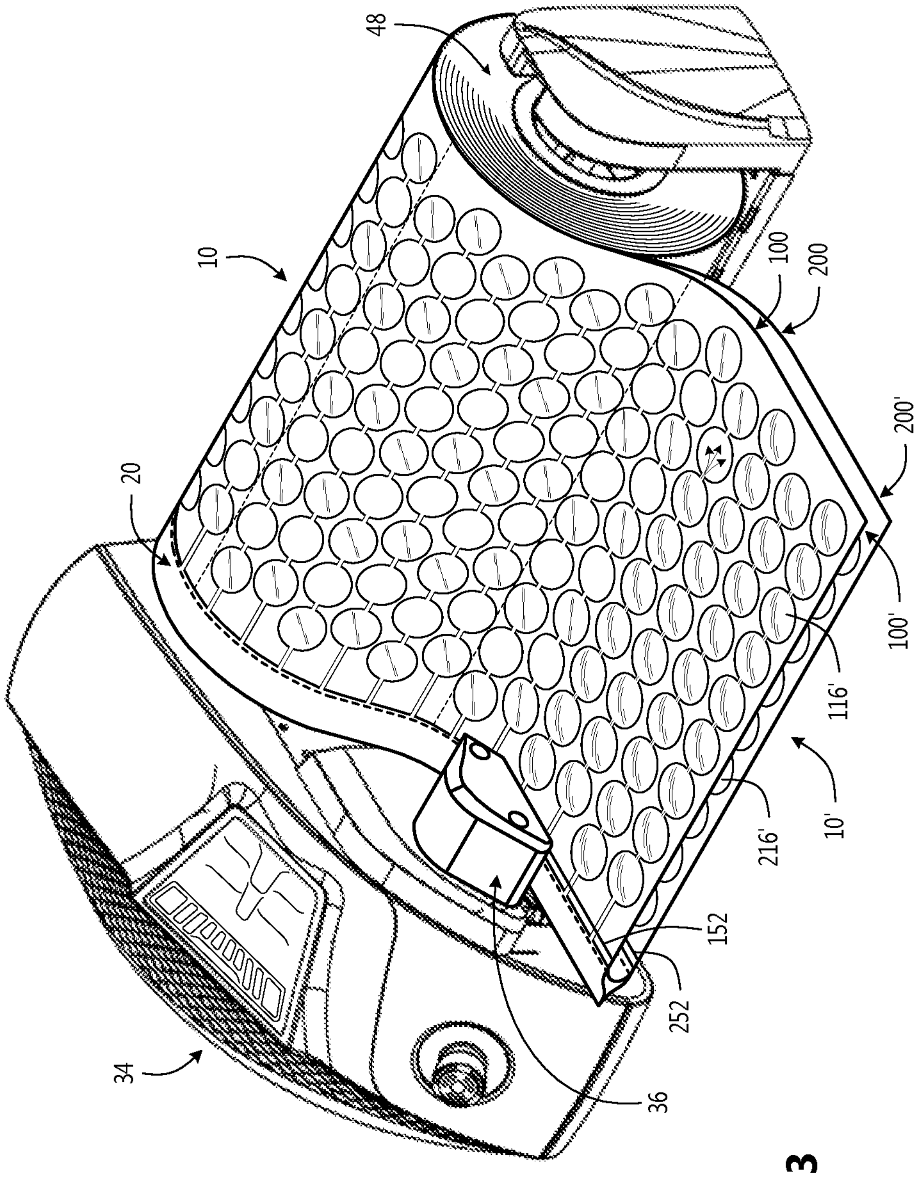
FIG. 3 depicts an embodiment of the inflatable web shown in FIG. 1 having been wound into a supply roll that is placed on an inflation and sealing apparatus, in accordance with the embodiments described herein.

The inflatable web 10 shown in FIGS. 1 and 2A-2C can be wound into a roll to form a supply roll of the inflatable web 10 for use with an inflation and sealing apparatus. Depicted in FIG. 3 is an embodiment of the inflatable web 10 wound into a supply roll 48 on an inflation and sealing apparatus 34. In the depicted example, the inflatable web 10 is arranged with the inflation zone 20 on a longitudinal edge of the supply roll 48 and the first and second inflatable panels 100 and 200 overlapping each other. Examples of inflation and sealing apparatuses are known, such as those shown in U.S. Pat. Nos. 7,225,599, 7,721,781, 8,978,345, 9,969,136, U.S. Patent Application Publication No. 2015/0075114, and U.S. patent application Ser. No. 16/064,277, the disclosure of each of which is hereby incorporated by reference in its entirety. In the depicted embodiment, the inflation and sealing apparatus 34 includes an inflation and sealing assembly 36. The inflation and sealing assembly 36 may include a nozzle (not visible) configured to be located between the flanges 30 of the inflatable web 10 and to direct gas (e.g., air) via the inflation zone 20 into the inflation ports 124 and 224 to inflate the inflatable chambers 116 and 216. The inflation and sealing assembly 36 may also include a sealer (not visible) that is located downstream of the nozzle and configured to form a seal in each of the inflatable panels 100 and 200 to seal the individual inflation ports 124 and 224 after the inflatable chambers 116 have been inflated. In some embodiments, the inflation and sealing assembly 36 may include a conveying mechanism that conveys the inflatable web 10 along a path of travel as shown in FIG. 3.

As the inflatable web 10 is pulled from the supply roll 48 and is inflated and sealed by the inflation and sealing assembly 36, the inflatable web 10 becomes an inflated web 10' with an inflated panel 100' having inflated chambers 116' and an inflated panel 200' having inflated chambers 216'. This inflated panel 100' has a seal 152 formed across the inflation ports 124 after inflation of the inflated chambers 116' and the inflated panel 200' has a seal 252 formed across the inflation ports 224 after inflation of the inflated chambers 216'. In various embodiments, the inflation and sealing assembly 36 can be run continuously to continuously form the inflatable web 10 into the inflated web 10' or intermittently to periodically forms portions of the inflatable web 10 into the inflated web 10'.

In some embodiments, transverse lines of weakness (e.g., lines of weakness between the flanges 30 and the longitudinal edges 132 and 232) may be formed in the inflatable web 10 or the inflated web 10' in order to enable a user to tear off portions of the inflated web 10'. In the depicted example, transverse lines of weakness 140 and 240 have been formed in the inflatable panels 100 and 200, respectively, of the inflatable web 10 before the inflatable web 10 is wound into the supply roll 48. In some embodiments, the transverse lines of weakness 140 and 240 may be formed at specific (e.g., regular) intervals in the inflatable web 10. In another example, the inflation and sealing apparatus 34 may include a cutting device upstream of the inflation and sealing assembly 36 to form lines of weakness in the inflatable web 10 after the inflatable web 10 has been pulled from the supply roll 48 and before the inflatable web 10 is inflated by the inflation and sealing assembly 36. In another example, the inflation and sealing apparatus 34 may include a cutting device downstream of the inflation and sealing assembly 36 to form lines of weakness in the inflated web 10' after the inflated web 10' has been inflated by the inflation and sealing assembly 36. In either of the last two examples, the cutting device may form the lines of weakness at non-regular intervals, such as at intervals specified by a user.

Figure 4C:
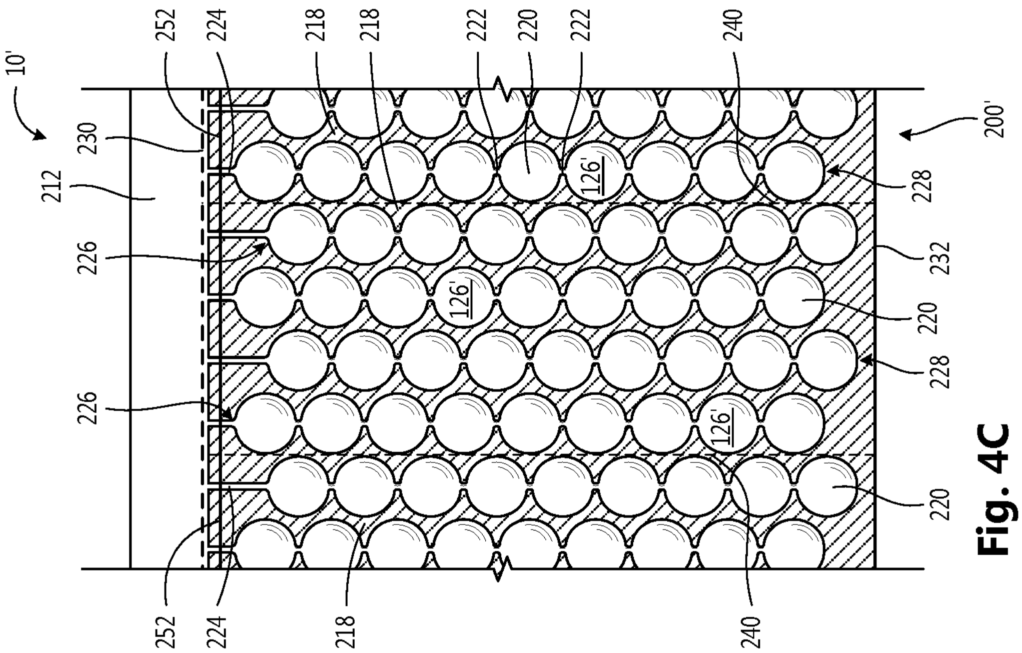
FIGS. 4A, 4B, and 4C depict front, right side, and back views, respectively, of a portion of an inflated web formed from the inflatable web by the inflation and sealing apparatus shown in FIG. 3, in accordance with the embodiments described herein.
Figure 4B:
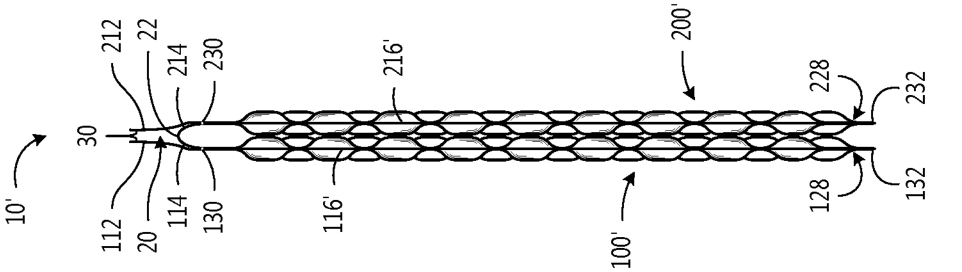
Figure 4A:
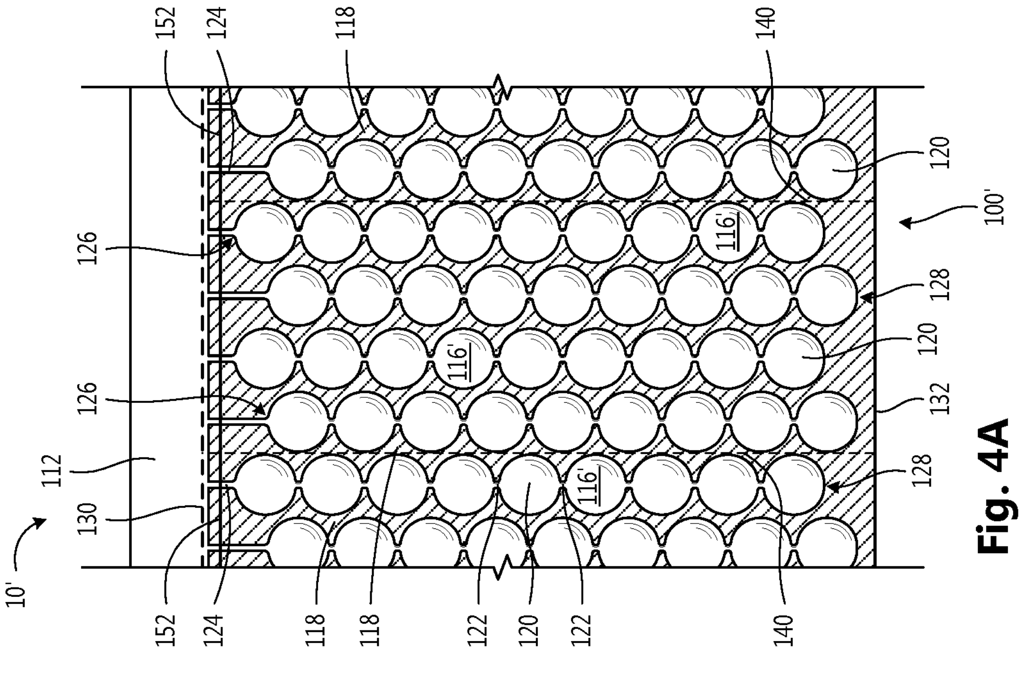

FIGS. 4A, 4B, and 4C depict front, right side, and back views, respectively, of a portion of the inflated web 10'. The inflated panel 100' and the inflated panel 200' of the inflated web 10' remain connected at the ends of the sheets 114 and 124. The inflated chambers 116' and 216' are inflated. The inflated chambers 116' are individually sealed by the seal 152 and the inflated chambers 216' are individually sealed by the seal 252. The lines of weakness 22, 130, and 230 also remain intact and are capable of being broken, as desired, for using the inflated web 10'. In this arrangement, a user can use the inflated web 10' in a number of different ways. Various ways that the inflated web 10' can be used are depicted in FIGS. 5A-5C, 6A-6B, and 7A-7C.

Figure 5C:
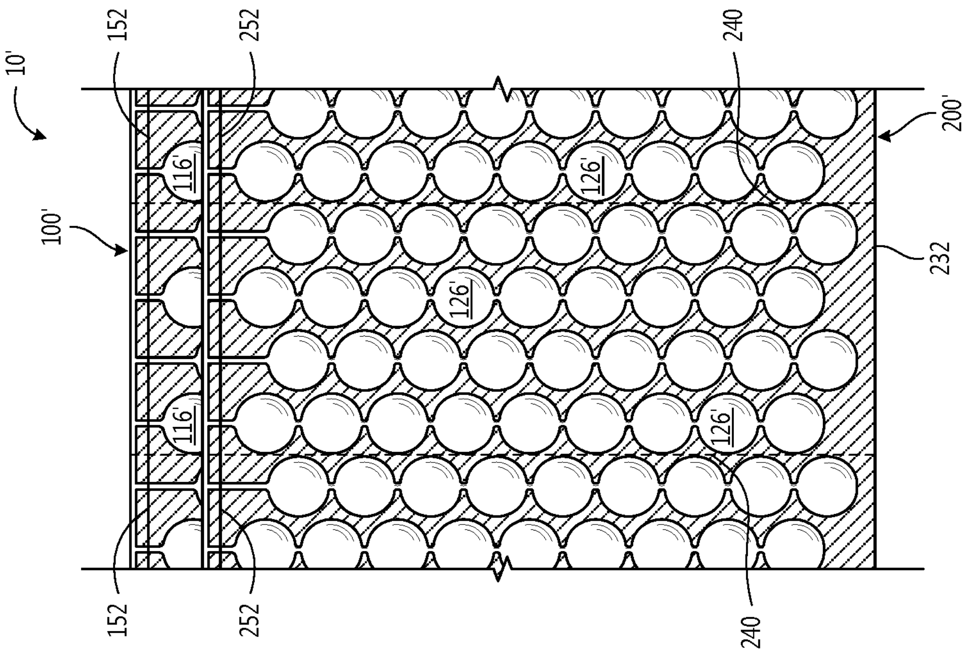
FIGS. 5A, 5B, and 5C depict front, side, and back views, respectively, of an embodiment of the inflated web shown in FIGS. 4A-4C having been broken into two separate inflated sheets, in accordance with the embodiments described herein.
Figure 5B:
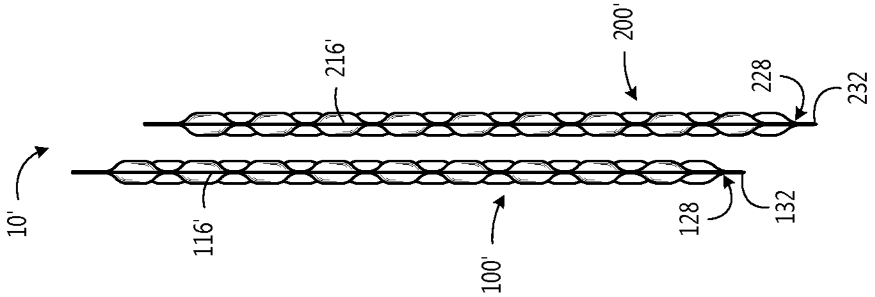
Figure 5A:
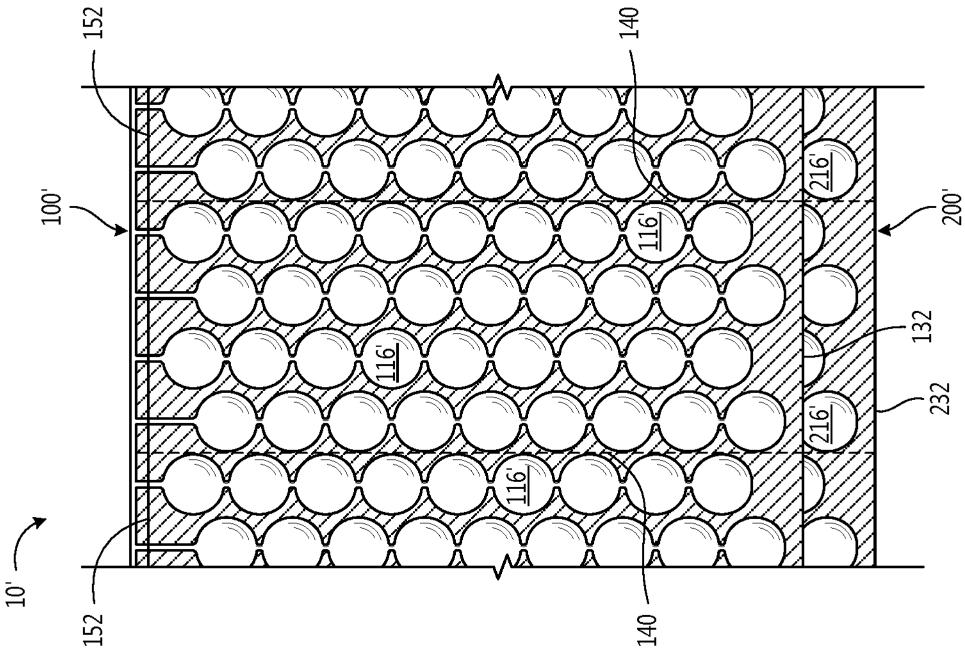

FIGS. 5A, 5B, and 5C depict front, side, and back views, respectively, of an embodiment of the inflated web 10' having been broken into two separate inflated sheets. In the depicted embodiment, the inflated web 10' was broken at the lines of weakness 130 and 230. The portions of the sheets 112, 114, 212, and 214 that were broken off, such as the flanges 30, have been discarded (e.g., recycled). This leaves the inflated panel 100' and the inflated panel 200' separated from each other. A user can use each of the two separated inflated sheets to be used to provide protection for objects. The ability to form two inflated sheets (e.g., the inflated panel 100' and the inflated panel 200') from the inflated web 10' allows the inflation and sealing apparatus 34 to form two inflated panels from the inflatable web 10 faster than it can using another inflatable web that has only one inflatable panel.

Figure 6A:
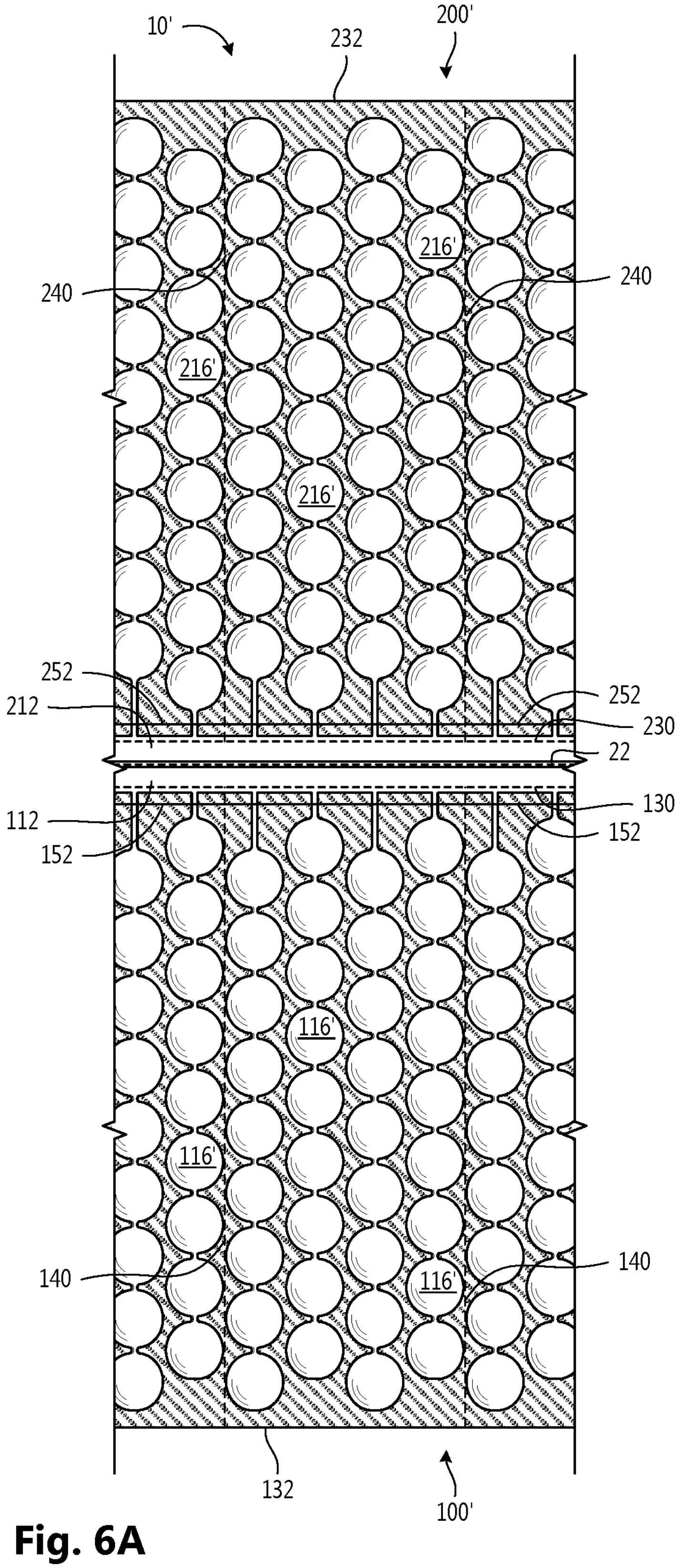
FIGS. 6A and 6B depict front and side views, respectively, of an embodiment of the inflated web shown in FIGS. 4A-4C as a single, wide inflated panel, in accordance with the embodiments described herein.
Figure 6B:
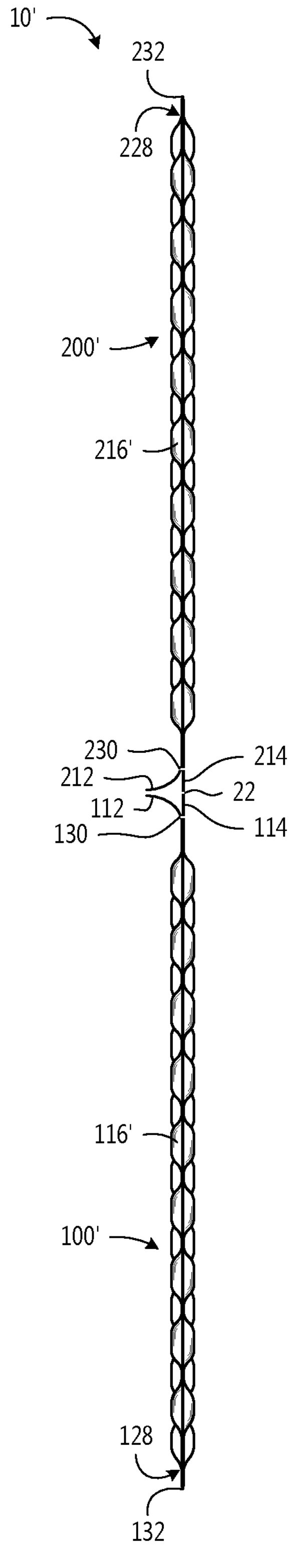

FIGS. 6A and 6B depict front and side views, respectively, of an embodiment of the inflated web 10' as a single, wide inflated panel. From the form of the inflated web 10' shown in FIGS. 4A-4C, the inflated web 10' has been "unfolded" to the form shown in FIGS. 6A and 6B. In the unfolded form, the longitudinal edge 132 is opposite from the longitudinal edge 232. None of the lines of weakness 22, 130, and 230 has been broken, leaving the inflated panel 100' connected to the inflated panel 200'. In this way, the width of the inflated web 10', after it has been unfolded, is approximately twice the width of the inflatable web 10 on the supply roll 48. In some embodiments, the width of the supply roll 48 is the widest inflatable web that can be inflated by the inflation and sealing apparatus 34. In this case, the unfolding of the inflated web 10' allows the resulting single inflated sheet to be approximately twice as wide as the inflation and sealing apparatus 34 can inflate using an inflatable web that has only one inflatable panel.

Figure 7C:
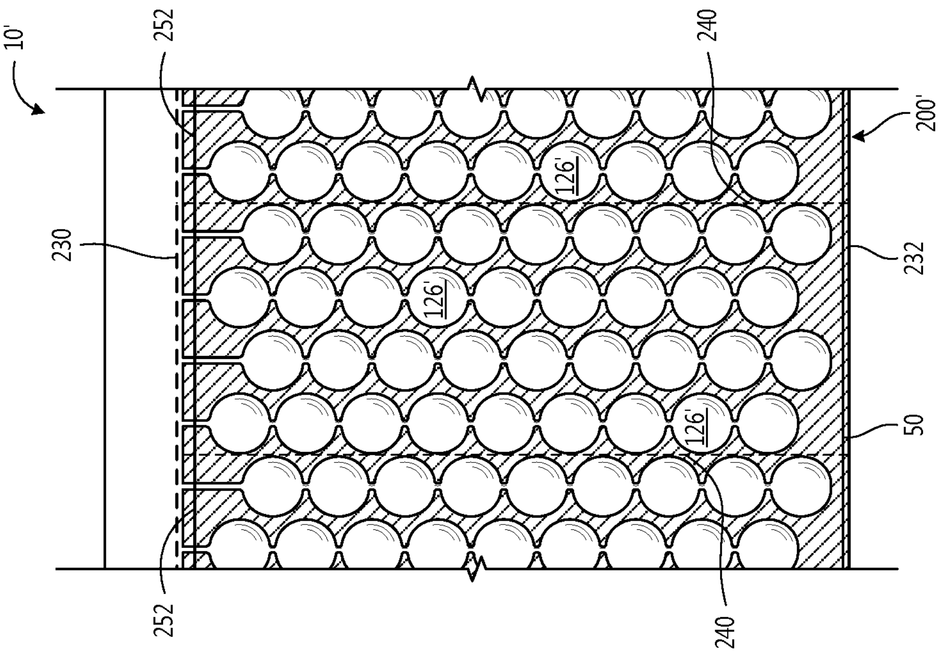
FIGS. 7A, 7B, and 7C depict front, side, and back views, respectively, of an embodiment of the inflated web shown in FIGS. 4A-4C having been formed into an inflated pouch, in accordance with the embodiments described herein.
Figure 7B:
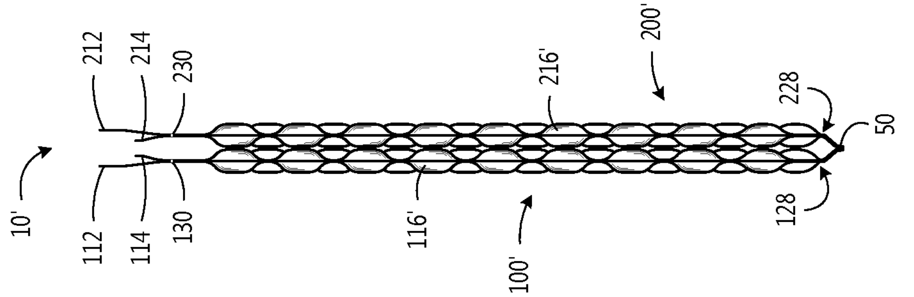
Figure 7A:
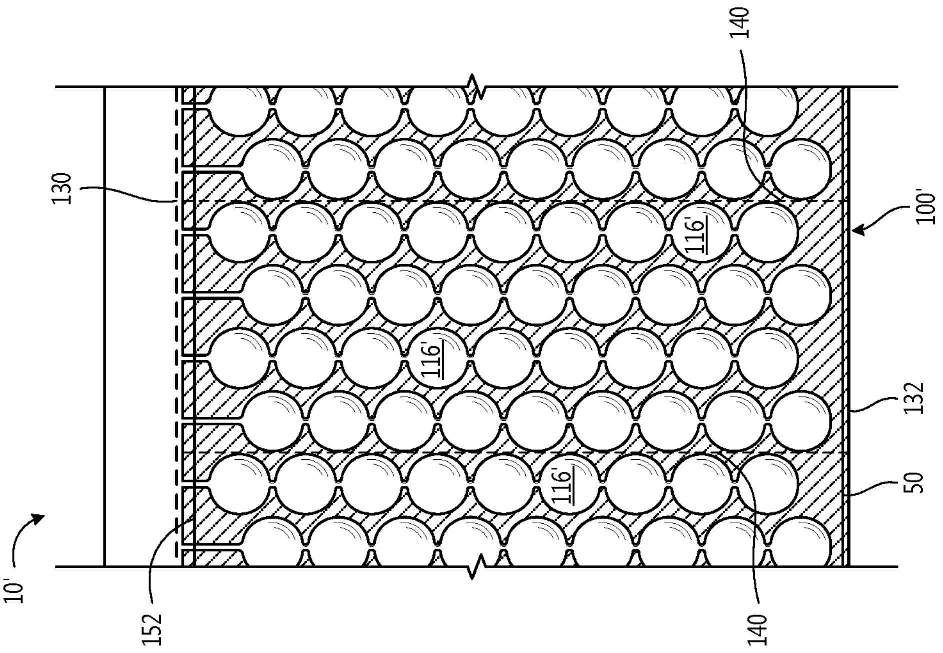

FIGS. 7A, 7B, and 7C depict front, side, and back views, respectively, of an embodiment of the inflated web 10' having been formed into an inflated pouch. A seal 50 has been formed near the longitudinal edges 132 and 232 of the inflated panels 200' and 200' to close the "bottom" of the inflated pouch. The line of weakness 22 has been broken so that the "tops" of the inflated pouch are separated and an object can been inserted into the pouch. Transverse seals (not shown) can also be formed in the inflated web 10' to form "sides" of the pouch. The seal 50 near the longitudinal edges 132 and 232 of the inflated panels 100' and 200' can be formed before the inflatable web 10 is wound into the supply roll 48, after the inflatable web 10 has been pulled from the supply roll 48 and before the inflatable web 10 is inflated by the inflation and sealing assembly 36, or after the inflated web 10' has been inflated by the inflation and sealing assembly 36.

The inflatable web 10 described above is one example of an embodiment of an inflatable web that has multiple inflatable panels. It will be apparent that variations of the inflatable web 10 are possible while still having a common inflation zone that is in fluid communication with multiple inflatable panels. Depicted in FIGS. 8A-8C and 9 are other embodiments of inflatable webs that have multiple inflatable panels. It will be apparent that further variations on these embodiments and combinations of features from each of these embodiments is possible.

Figures 8A, 8B, 8C:
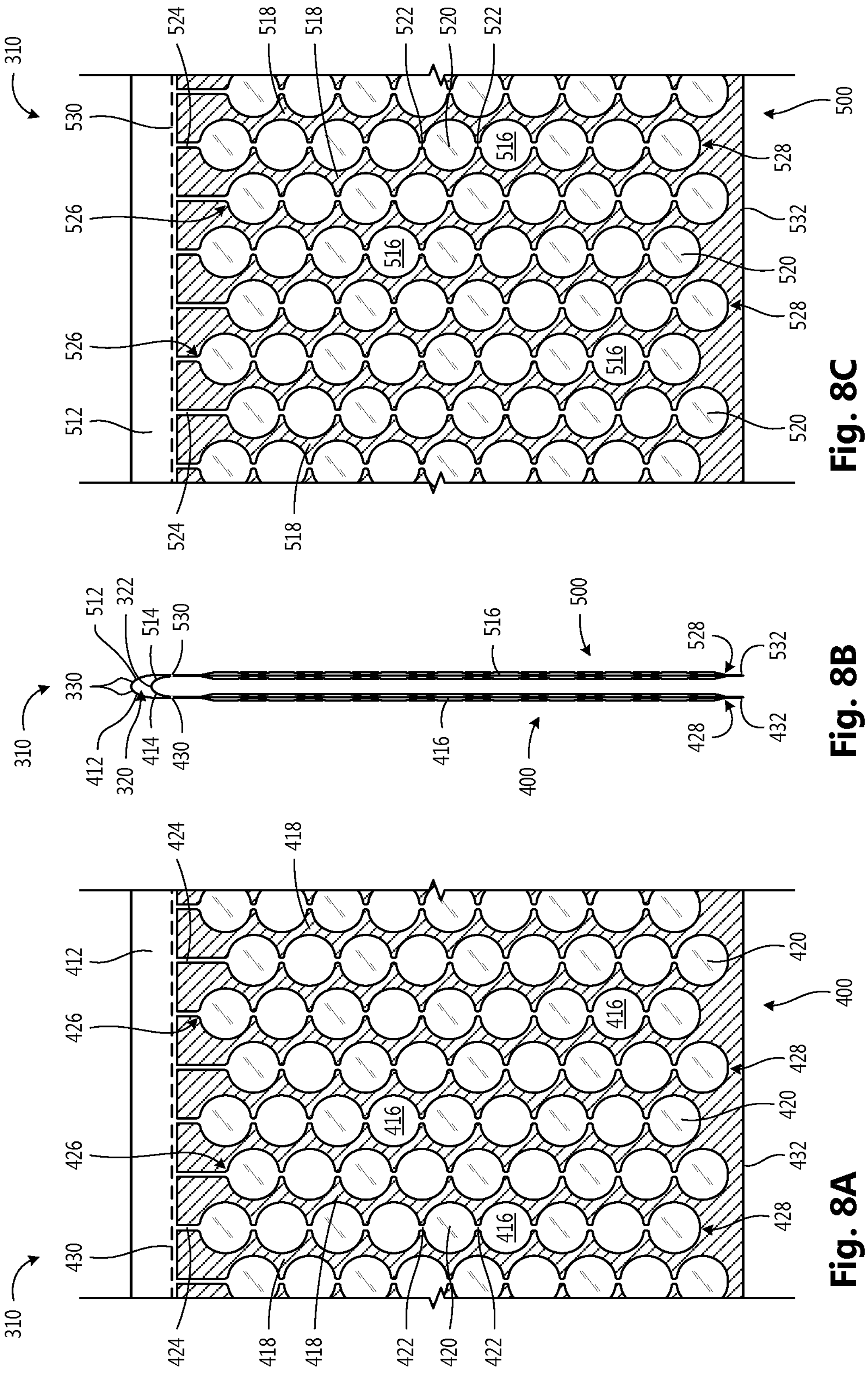
FIGS. 8A, 8B, and 8C depict front, right side, and back views, respectively, of a portion of another embodiment of an inflatable web, in accordance with the embodiments described herein.

FIGS. 8A, 8B, and 8C depict front, right side, and back views, respectively, of a portion of another embodiment of an inflatable web 310. The inflatable web 310 includes an inflation zone 320 that is bounded by flanges 330 on the front, back, and top of the inflatable web 310. In the depicted embodiment, the inflation zone 320 is "closed" because the flanges 330 meet at the top of the inflatable web 310. The inflatable web 310 includes an inflatable panel 400 and an inflatable panel 500. Each of the inflatable panels 400 and 500 is in fluid communication with the inflation zone 320 such that a fluid, such as a gas (e.g., air), can pass through inflation zone 320 into both of the inflatable panels 400 and 500.

The inflatable panel 400 includes a sheet 412 and a sheet 414. The sheets 412 and 414 have respective inner surfaces that are sealed to each other in a pattern that defined a series of inflatable chambers 416. The sheets 412 and 414 are sealed to each other by seals 418 that define the inflatable chambers 416. In the depicted embodiment, the inflatable chambers 416 are shaped to have a series of cells 420 and passageways 422. In some embodiments, the cells 420 have a larger width than the passageways 422. In the depicted embodiment, the cells 420 have a generally circular shape such that, after the cells 420 are inflated, the cells 420 would have a three-dimensional "bubble" shape. In other embodiments, the cells 420 may have other shapes. The seals 418 also define inflation ports 424. Each of the inflation ports 424 permits fluid, such as gas (e.g., air), to pass from the inflation zone 320 into one of the inflatable chambers 416. The inflatable panel 400 also includes a longitudinal edge 432 that is opposite from the flanges 330.

The inflatable panel 500 includes a sheet 512 and a sheet 514. The sheets 512 and 514 have respective inner surfaces that are sealed to each other in a pattern that defined a series of inflatable chambers 516. In the depicted embodiment, adjacent ones of the inflatable chambers 516 are offset from each other to enable the inflatable chambers 516 to be arranged in close proximity to each other. The sheets 512 and 514 are sealed to each other by seals 518 that define the inflatable chambers 516. In the depicted embodiment, the inflatable chambers 516 are shaped to have a series of cells 520 and passageways 522. In some embodiments, the cells 520 have a larger width than the passageways 522. In the depicted embodiment, the cells 520 have a generally circular shape such that, after the cells 520 are inflated, the cells 520 would have a three-dimensional "bubble" shape. In other embodiments, the cells 520 may have other shapes. The seals 518 also define inflation ports 524. Each of the inflation ports 524 permits fluid, such as gas (e.g., air), to pass from the inflation zone 320 into one of the inflatable chambers 516. The inflatable panel 500 also includes a longitudinal edge 532 that is opposite from the flanges 330.

In the depicted embodiment, the flanges 330 are formed by a portion of each of the sheets 412 and 512. In particular, one of the flanges 330 is formed by a portion of the sheet 412 that extends beyond the inflation ports 424 and the other of the flanges 330 is formed by a portion of the sheet 512 that extends by beyond the inflation ports 524. In the depicted embodiment, the flanges 330 extend out a substantially equal distance beyond inflation ports 424 and 524. The flanges 330 accordingly have equivalent widths, shown as width W. The flanges 330, in conjunction with inflation ports 424 and 524 and the seals 418 and 518, constitute the inflation zone 320 in inflatable web 310 that is advantageously configured to provide rapid and reliable inflation of the inflatable chambers 416 and 516.

In some embodiments, the seal patterns of seals 418 and 518 provide uninflatable planar regions between inflatable chambers 416 and 516, respectively. These planar regions serve as flexible junctions that may advantageously be used to bend or conform the inflated web about a product in order to provide optimal cushioning protection. In another embodiment, the seal patterns can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference. The seals 418 and 518 may be heat seals between the inner surfaces of the sheets 412 and 414 and between the inner surfaces of the sheets 512 and 514, respectively. Alternatively, sheets 412 and 414 may be adhesively bonded to each other and sheets 512 and 514 may be adhesively bonded to each other. Heat seals are preferred and, for brevity, the term "heat seal" is generally used hereinafter. This term should be understood, however, to include the formation of seals 418 by adhesion of sheets 412 and 414 and/or the formation of seals 518 by adhesion of sheets 512 and 514 as well as by heat sealing.

In some embodiments, the sheets 412, 414, 512, and 514 comprise a thermoplastic heat sealable polymer on their inner surface such that, after superposition of sheets 412 and 414 and superposition of sheets 512 and 514, inflatable web 310 can be formed by passing the superposed sheets beneath a sealing roller having heated raised land areas that correspond in shape to the desired pattern of seals 418 and 518. The sealing roller applies heat and forms the seals 418 between sheets 412 and 414 and the seals 518 between sheets 512 and 514 in the desired patterns, and thereby also forms inflatable chambers 416 and 516 with a desired shape. The sealing pattern on the sealing roller also provides intermittent seals at proximal ends 426, thus forming inflation ports 424, and at proximal ends 526, thus forming inflation ports 524, and also effectively resulting in the formation of the flanges 330. The sealing pattern on the roller may also form the distal ends 428 and 528. Further details concerning this manner of making inflatable web 310 are disclosed in U.S. Pat. No. 6,800,162, the disclosure of which is hereby incorporated herein by reference in its entirety.

In some embodiments, the heat sealability of sheets 412, 414, 512, and 514 can be provided by employing a monolayer sheet comprising a heat sealable polymer or a multilayer sheet comprising an inner layer comprising a heat sealable polymer. In either case, inflation ports 424 and 524 preferably also comprise inner surfaces that are heat sealable to one another to allow such ports to be closed by heat sealing means after inflation of a corresponding chamber.

In some embodiments, the sheets 412, 414, 512, and 514 may initially be separate sheets that are brought into superposition and sealed. In these embodiments, the longitudinal edge 432 is formed by sealing the individual sheets 412 and 414 as part of the pattern of seals 418 and the longitudinal edge 532 is formed by sealing the individual sheets 512 and 514 as part of the pattern of seals 518. In some embodiments, any combination of two or more of the sheets 412, 414, 512, and 514 may be formed by folding a single sheet onto itself. In one example, the sheets 412 and 414 may be formed by a single sheet that is folded with the heat sealable surface of the single sheet facing inward. The fold in the single sheet forms the longitudinal edge 432 of the inflatable panel 400 that is opposite from the flanges 330. In another example, the sheets 512 and 514 may be formed by a single sheet that is folded with the heat sealable surface of the single sheet facing inward. The fold in the single sheet forms the longitudinal edge 532 of the inflatable panel 500 that is opposite from the flanges 330. In some embodiments, all of the sheets 412, 414, 512, and 514 are formed from a single sheet where by folding a single sheet onto itself multiple times so that the heat sealable surface of the single sheet faces inward between the sheets 412 and 414 and between the sheets 512 and 514 and so that the exterior surface (e.g., non-heat-sealable surface) of the single sheet faces inward between the sheets 414 and 514.

In general, the sheets 412, 414, 512, and 514 may comprise any flexible material that can be manipulated to enclose a gas in inflatable chambers 416 and 516 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

In the depicted embodiment, the inflatable web 310 includes lines of weakness that facilitate the tearing of portions of the inflatable web 310. In the depicted embodiment, the inflatable web 310 includes three lines of weakness in the form of perforation lines. The inflatable web 310 includes a line of weakness 322 between the sheet 414 and the sheet 514. As discussed in greater detail below, the line of weakness 322 may allow the inflatable web 310 to be broken, after it has been inflated, to form a pouch structure. The inflatable web 310 also includes a line of weakness 430 in the inflatable panel 400. The line of weakness 430 is a perforated line that passes through both the sheet 412 and the sheet 414. As discussed in greater detail below, after the inflatable web 310 is inflated, the inflatable web 310 can be broken at the line of weakness 430 to separate the inflatable panel 400 from the remainder of the inflatable web 310. The inflatable web 310 also includes a line of weakness 530 in the inflatable panel 500. The line of weakness 530 is a perforated line that passes through both the sheet 512 and the sheet 514. As discussed in greater detail below, after the inflatable web 310 is inflated, the inflated web can be broken at the line of weakness 530 to separate the inflated panel 500' from the remainder of the inflatable web 310. In the depicted embodiment, the flanges 330 do not include any line of weakness. Most inflation and sealing apparatuses that configured to inflate and seal the closed inflation zone 320 include a cutting element (e.g., a blade) configured to cut (or slit) the inflatable web 310 between the flanges 330 as the inflatable web passes through an inflation and seal assembly.

The inflatable web 310 can be inflated and sealed by an inflation and seal apparatus to form an inflated web. The inflated web formed from the inflatable web 310 can be used in ways similar to those described above with respect to inflated web 10'. For example, the inflated web formed from the inflatable web 310 can be broken at the lines of weakness 430 and 530 to form two inflated sheets, can be unfolded to form a single, wide inflated sheet, or sealed near the longitudinal edges 432 and 532 and broken at the line of weakness 322 to form inflated pouches.

Figure 9A:
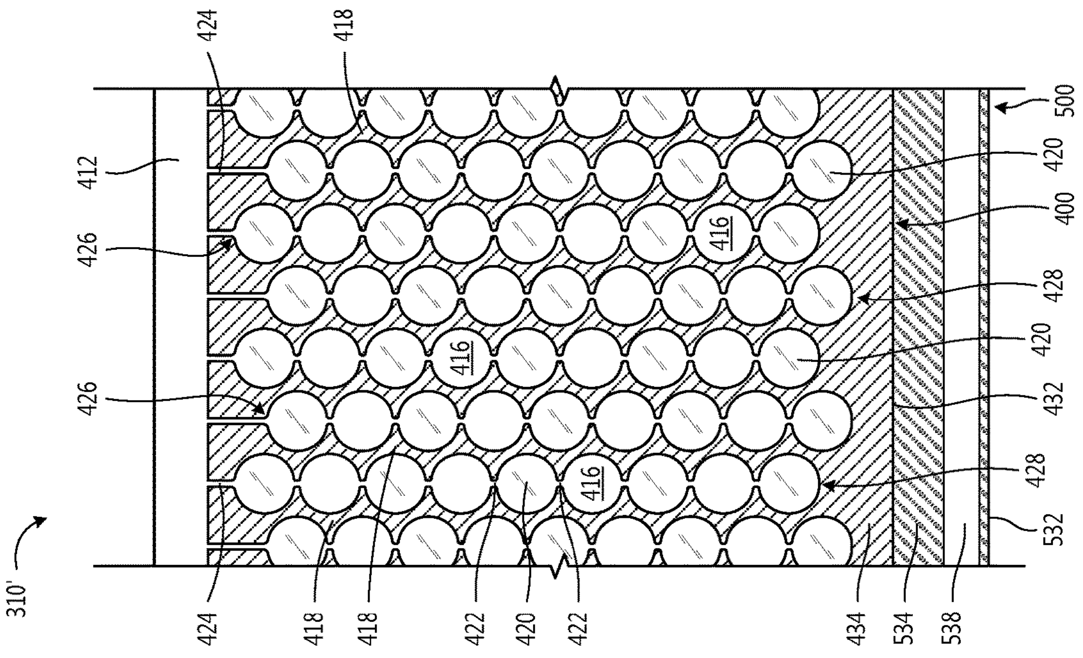
FIGS. 9A, 9B, and 9C depict front, right side, and back views, respectively, of a portion of another embodiment of an inflatable web that is a variation of the inflatable web depicted in FIGS. 8A to 8C, in accordance with the embodiments described herein.
Figure 9B:
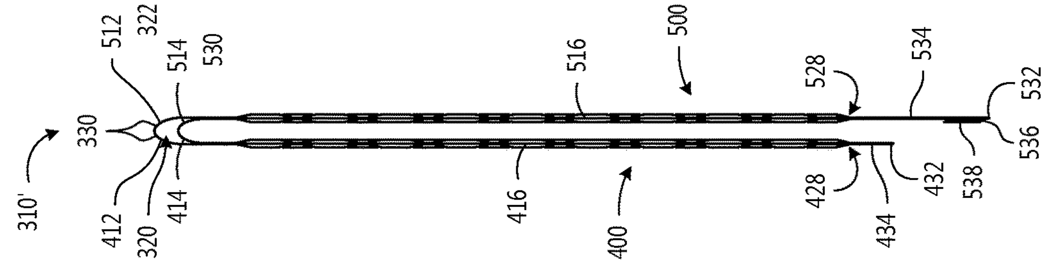
Figure 9C:
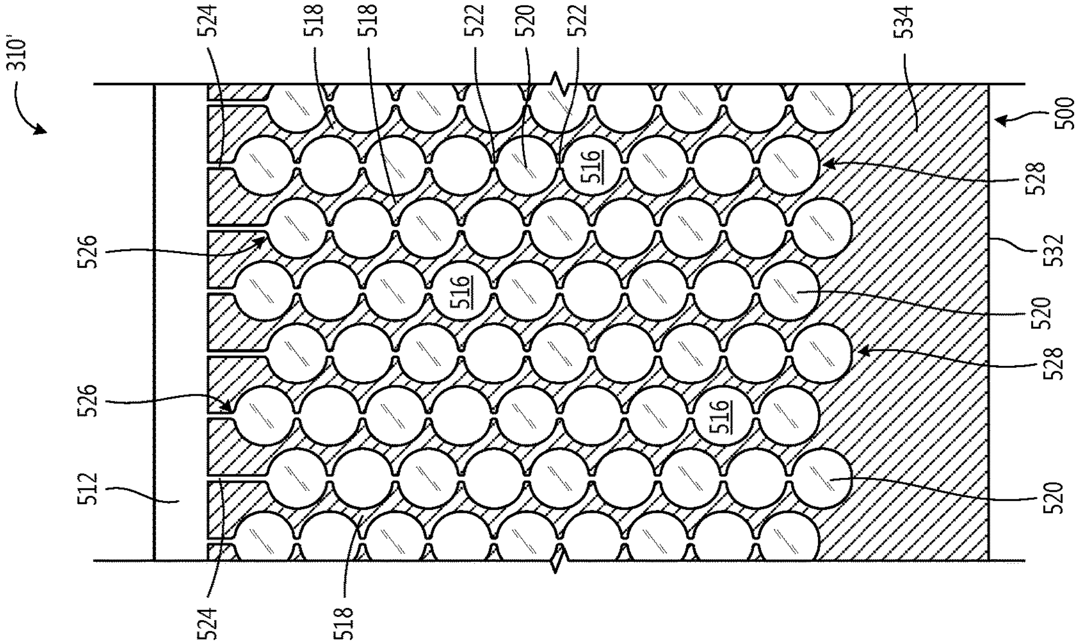

FIGS. 9A, 9B, and 9C depict front, right side, and back views, respectively, of a portion of another embodiment of an inflatable web 310' that is a variation of the inflatable web 310 depicted in FIGS. 8A, 8B, and 8C. In the depicted embodiment, the longitudinal edge 432 in the inflatable web 310' extends further away from the distal ends 428 than in the inflatable web 310 and the longitudinal edge 532 in the inflatable web 310' extends further away from the distal ends 528 than in the inflatable web 310. The area of the inflatable panel 400 that is between the distal ends 428 and the longitudinal edge 432 forms a flap 434. The area of the inflatable panel 500 that is between the distal ends 528 and the longitudinal edge 532 forms a flap 534. In the depicted embodiment, the longitudinal edge 532 extends away from the distal ends 528 further than the longitudinal edge 432 extends away from the distal ends 428 such that the flap 534 is longer than the flap 434.

In some embodiments, one of the flaps 434 and 534 includes a closure mechanism configured to couple the flaps 434 and 534 to each other. In the depicted embodiment, the flap 534 includes a closure mechanism in the form of an adhesive layer 536. The adhesive layer 536 is located on a side of the flap 534 that is formed by the sheet 514 (sometimes referred to as the "inner" side of the flap 534). At the instance shown in FIGS. 9A to 9C, the adhesive layer 536 is covered by a release liner 538 that limits exposure of the adhesive layer 536 until it is adhered to the flap 434. After the release liner 538 is removed to expose the adhesive layer 536, the flap 534 can be bent so that the adhesive layer 536 contacts and adheres to the side of the flap 434 that is formed by the sheet 412 (sometimes referred to as the "outer" side of the flap 434). Once the flap 534 is adhered to the flap 434 in this manner, the flaps 434 and 534 close the distal ends of the inflatable panels 400 and 500.

The inflatable web 310' can be used to form a pouch structure. The inflatable panels 400 and 500 can be inflated by inserting a gas through the inflation zone 320 and the inflation ports 424 and 524 to inflate the inflatable chambers 416 and 516. The inflation ports 424 and 524 can then be closed (e.g., by sealing the inflation ports 424 and 524) so that the inflatable panels 400 and 500 and the inflatable web 310' remain inflated. The portions of the sheets 414 and 514 between the seals 418 and 518 form the "bottom" of the pouch. In the depicted embodiment, the inflatable web 310' does not have lines of weakness in portions of the sheets 414 and 514 between the seals 418 and 518 so that the bottom of the pouch is less likely to tear or rip inadvertently. Transverse seals (not shown) can also be formed in the inflatable web 310' (either before or after inflation) to form "sides" of the pouch. The flaps 434 and 534 form the "top" of the pouch. After the inflatable web 310' is inflated and the transverse seals form the sides of the pouch, a user can insert one or more objects into the pouch between the flaps 434 and 534. After the object or objects are inside the pouch, the user can close the pouch by removing the release liner 538 from the adhesive layer 536 and adhering the adhesive layer 536 to the outer side of the flap 434.

As can be seen in the configuration shown in FIGS. 9A and 9B, the inflation zone 320 in on an opposite side of the inflatable web 310' from the flaps 434 and 534. If the inflatable web 310' is rolled into a supply roll (e.g., in the form of the supply roll 48 shown in FIG. 3), the inflation zone 320 will be on one side of the supply roll and the flaps 434 and 534 with the closure mechanism will be on the other side of the supply roll. In this way, the flaps 434 and 534 and the closure mechanism are away from the inflation zone 320 so that the inflation and sealing of the chambers 416 and 516 (e.g., by the inflation and sealing apparatus 34) is not affected by the flaps 434 and 534 and the closure mechanism. While the example of the inflatable web 310' has a closed inflation zone (i.e., inflation zone 320), it will be apparent that the inflatable web 310' could also have an open inflation zone and still be used to form pouches in the manner described above.

Figure 10B:
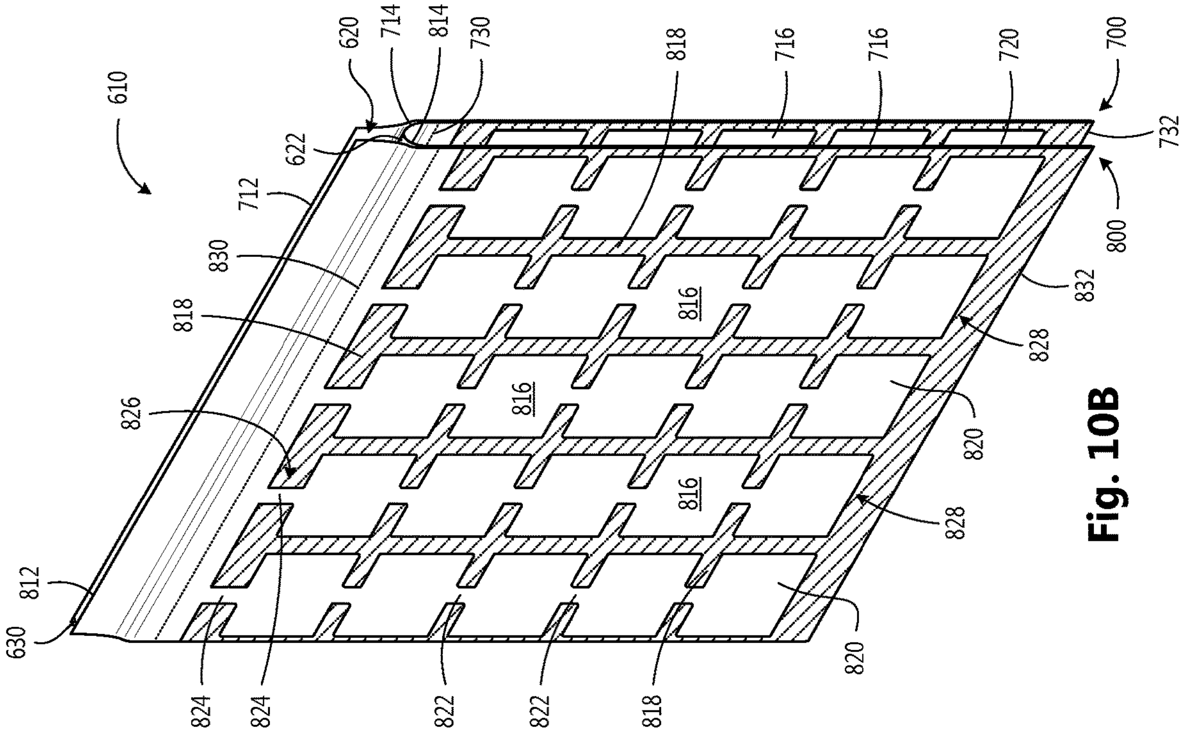
FIGS. 10A and 10B depict front perspective and back perspective views, respectively, of another embodiment of an inflatable web, in accordance with the embodiments described herein.
Figure 10A:
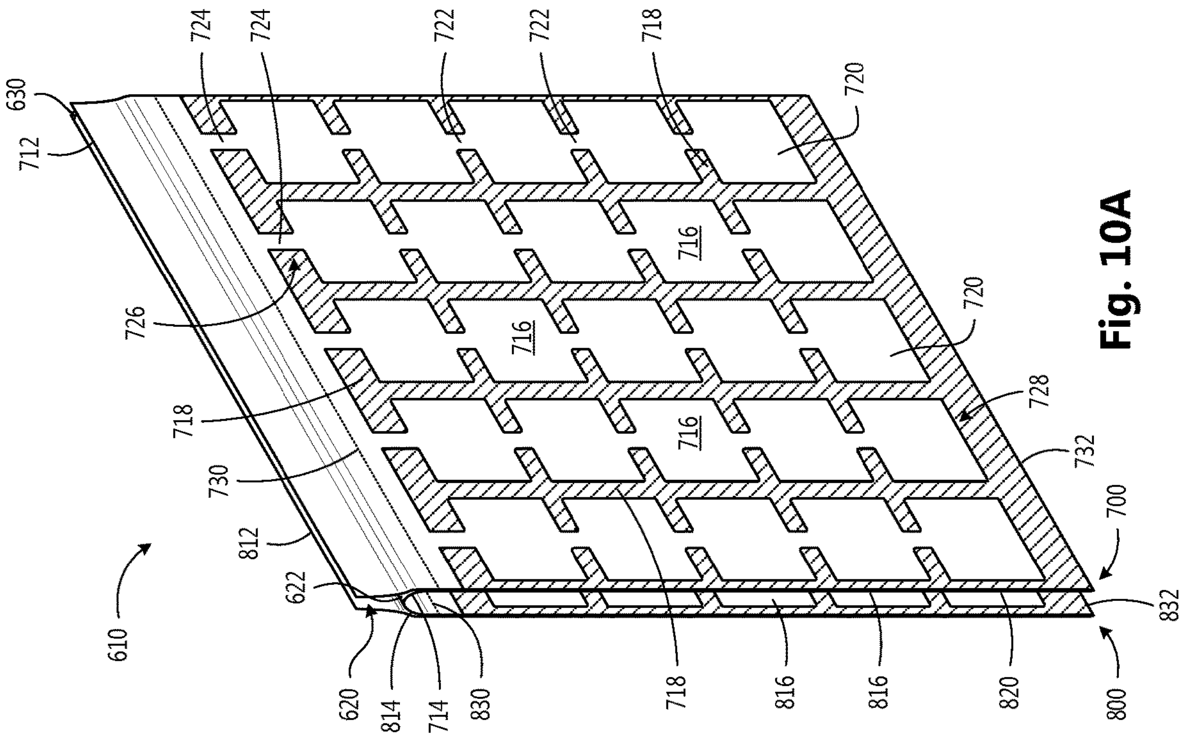

FIGS. 10A and 10B depict front perspective and back perspective views, respectively, of another embodiment of an inflatable web 610. The inflatable web 610 includes an inflation zone 620 that is bounded by flanges 630 on the front, back, and top of the inflatable web 60. In the depicted embodiment, the inflation zone 620 is "open" because the flanges 630 do not meet at the top of the inflatable web 610. The inflatable web 610 includes an inflatable panel 700 and an inflatable panel 800. Each of the inflatable panels 700 and 800 is in fluid communication with the inflation zone 620 such that a fluid, such as a gas (e.g., air), can pass through inflation zone 620 into both of the inflatable panels 700 and 800.

The inflatable panel 700 includes a sheet 712 and a sheet 714. The sheets 712 and 714 have respective inner surfaces that are sealed to each other in a pattern that defined a series of inflatable chambers 716. The sheets 712 and 714 are sealed to each other by seals 718 that define the inflatable chambers 716. In the depicted embodiment, the inflatable chambers 716 are shaped to have a series of cells 720 and passageways 722. In some embodiments, the cells 720 have a larger width than the passageways 722. In the depicted embodiment, the cells 720 have a generally square shape such that, after the cells 720 are inflated, the cells 720 would have a three-dimensional "quilt" shape. In other embodiments, the cells 720 may have other shapes. The seals 718 also define inflation ports 724. Each of the inflation ports 724 permits fluid, such as gas (e.g., air), to pass from the inflation zone 620 into one of the inflatable chambers 716. The inflatable panel 700 also includes a longitudinal edge 732 that is opposite from the flanges 630.

The inflatable panel 800 includes a sheet 812 and a sheet 814. The sheets 812 and 814 have respective inner surfaces that are sealed to each other in a pattern that defined a series of inflatable chambers 816. In the depicted embodiment, adjacent ones of the inflatable chambers 816 are offset from each other to enable the inflatable chambers 816 to be arranged in close proximity to each other. The sheets 812 and 814 are sealed to each other by seals 818 that define the inflatable chambers 816. In the depicted embodiment, the inflatable chambers 816 are shaped to have a series of cells 820 and passageways 822. In some embodiments, the cells 820 have a larger width than the passageways 822. In the depicted embodiment, the cells 820 have a generally square shape such that, after the cells 820 are inflated, the cells 820 would have a three-dimensional "quilt" shape.

In other embodiments, the cells 820 may have other shapes. The seals 818 also define inflation ports 824. Each of the inflation ports 824 permits fluid, such as gas (e.g., air), to pass from the inflation zone 620 into one of the inflatable chambers 816. The inflatable panel 800 also includes a longitudinal edge 832 that is opposite from the flanges 630.

In the depicted embodiment, the flanges 630 are formed by a portion of each of the sheets 712 and 812. In particular, one of the flanges 630 is formed by a portion of the sheet 712 that extends beyond the inflation ports 724 and the other of the flanges 630 is formed by a portion of the sheet 812 that extends by beyond the inflation ports 824. In the depicted embodiment, the flanges 630 extend out a substantially equal distance beyond inflation ports 724 and 824. The flanges 630 accordingly have equivalent widths, shown as width W. The flanges 630, in conjunction with inflation ports 724 and 824 and the seals 718 and 818, constitute the inflation zone 620 in web 610 that is advantageously configured to provide rapid and reliable inflation of the inflatable chambers 716 and 816.

In some embodiments, the seal patterns of seals 718 and 818 provide uninflatable planar regions between inflatable chambers 716 and 816, respectively. These planar regions serve as flexible junctions that may advantageously be used to bend or conform the inflated web about a product in order to provide optimal cushioning protection. In another embodiment, the seal patterns can comprise relatively narrow seals that do not provide planar regions. These seals serve as the common boundary between adjacent chambers. Such a seal pattern is shown for example in U.S. Pat. No. 7,551,379, the disclosure of which is incorporated herein by reference. The seals 718 and 818 may be heat seals between the inner surfaces of the sheets 712 and 714 and between the inner surfaces of the sheets 812 and 814, respectively. Alternatively, sheets 712 and 714 may be adhesively bonded to each other and sheets 812 and 814 may be adhesively bonded to each other. Heat seals are preferred and, for brevity, the term "heat seal" is generally used hereinafter. This term should be understood, however, to include the formation of seals 718 by adhesion of sheets 712 and 714 and/or the formation of seals 818 by adhesion of sheets 812 and 814 as well as by heat sealing.

In some embodiments, the sheets 712, 714, 812, and 814 comprise a thermoplastic heat sealable polymer on their inner surface such that, after superposition of sheets 712 and 714 and superposition of sheets 812 and 814, web 610 can be formed by passing the superposed sheets beneath a sealing roller having heated raised land areas that correspond in shape to the desired pattern of seals 718 and 818. The sealing roller applies heat and forms the seals 718 between sheets 712 and 714 and the seals 818 between sheets 812 and 814 in the desired patterns, and thereby also forms inflatable chambers 716 and 816 with a desired shape. The sealing pattern on the sealing roller also provides intermittent seals at proximal ends 726, thus forming inflation ports 724, and at proximal ends 826, thus forming inflation ports 824, and also effectively resulting in the formation of the flanges 630. The sealing pattern on the roller may also form the distal ends 728 and 728. Further details concerning this manner of making inflatable web 610 are disclosed in U.S. Pat. No. 6,800,162, the disclosure of which is hereby incorporated herein by reference in its entirety.

In some embodiments, the heat sealability of sheets 712, 714, 812, and 814 can be provided by employing a monolayer sheet comprising a heat sealable polymer or a multilayer sheet comprising an inner layer comprising a heat sealable polymer. In either case, inflation ports 724 and 824 preferably also comprise inner surfaces that are heat sealable to one another to allow such ports to be closed by heat sealing means after inflation of a corresponding chamber.

In some embodiments, the sheets 712, 714, 812, and 814 may initially be separate sheets that are brought into superposition and sealed. In these embodiments, the longitudinal edge 732 is formed by sealing the individual sheets 712 and 714 as part of the pattern of seals 718 and the longitudinal edge 832 is formed by sealing the individual sheets 812 and 814 as part of the pattern of seals 818. In some embodiments, any combination of two or more of the sheets 712, 714, 812, and 814 may be formed by folding a single sheet onto itself. In one example, the sheets 712 and 714 may be formed by a single sheet that is folded with the heat sealable surface of the single sheet facing inward. The fold in the single sheet forms the longitudinal edge 732 of the inflatable panel 700 that is opposite from the flanges 630. In another example, the sheets 812 and 814 may be formed by a single sheet that is folded with the heat sealable surface of the single sheet facing inward. The fold in the single sheet forms the longitudinal edge 832 of the inflatable panel 800 that is opposite from the flanges 630. In some embodiments, all of the sheets 712, 714, 812, and 814 are formed from a single sheet where by folding a single sheet onto itself multiple times so that the heat sealable surface of the single sheet faces inward between the sheets 712 and 714 and between the sheets 812 and 814 and so that the exterior surface (e.g., non-heat-sealable surface) of the single sheet faces inward between the sheets 714 and 814.

In general, the sheets 712, 714, 812, and 814 may comprise any flexible material that can be manipulated to enclose a gas in inflatable chambers 716 and 816 as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

In the depicted embodiment, the inflatable web 610 includes lines of weakness that facilitate the tearing of portions of the inflatable web 610. In the depicted embodiment, the inflatable web 610 includes three lines of weakness in the form of perforation lines. The inflatable web 610 includes a line of weakness 622 between the sheet 714 and the sheet 814. As discussed in greater detail below, the line of weakness 622 may allow the inflatable web 610 to be broken, after it has been inflated, to form a pouch structure. The inflatable web 610 also includes a line of weakness 730 in the inflatable panel 700. The line of weakness 730 is a perforated line that passes through both the sheet 712 and the sheet 714. As discussed in greater detail below, after the inflatable web 610 is inflated, the inflatable web 610 can be broken at the line of weakness 730 to separate the inflatable panel 700 from the remainder of the inflatable web 610. The inflatable web 610 also includes a line of weakness 830 in the inflatable panel 800. The line of weakness 830 is a perforated line that passes through both the sheet 812 and the sheet 814. As discussed in greater detail below, after the inflatable web 610 is inflated, the inflated web can be broken at the line of weakness 830 to separate the inflated panel 800' from the remainder of the inflatable web 610. In the depicted embodiment, the flanges 630 do not include any line of weakness. Most inflation and sealing apparatuses that configured to inflate and seal the closed inflation zone 620 include a cutting element (e.g., a blade) configured to cut (or slit) the inflatable web 610 between the flanges 630 as the inflatable web passes through an inflation and seal assembly.

The inflatable web 610 can be inflated and sealed by an inflation and seal apparatus to form an inflated web. The inflated web formed from the inflatable web 610 can be used in ways similar to those described above with respect to inflated web 10'. For example, the inflated web formed from the inflatable web 610 can be broken at the lines of weakness 730 and 830 to form two inflated sheets, can be unfolded to form a single, wide inflated sheet, or sealed near the longitudinal edges 732 and 832 and broken at the line of weakness 622 to form inflated pouches.

Figure 11A:
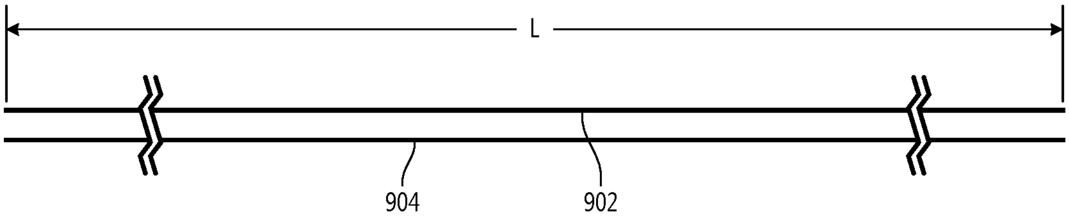

The embodiments of inflatable webs disclosed herein can be formed in a number of ways. One embodiment of forming an inflatable web is depicted in FIGS. 11A to 110. FIG. 11A depicts a cross-sectional side view of a first sheet 902 and a second sheet 904 that can be formed into an inflatable web. The first and second sheets 902 and 904 have substantially similar transverse lengths L. In the depicted embodiment, the first and second sheets 902 and 904 are arranged so that the transverse sides of first and second sheets 902 and 904 (i.e., the left and right sides of the first and second sheets 902 and 904 when viewed in FIG. 11A) are substantially aligned. In some embodiments, the surface of the first sheet 902 that faces the second sheet 904 and the surface of the second sheet 904 that faces the first sheet 902 are heat-sealable surfaces. In some embodiments, the surface of the first sheet 902 that faces away from the second sheet 904 and the surface of the second sheet 904 that faces away from the first sheet 902 are less susceptible to heat sealing surfaces that the other surfaces of the first and second sheets 902 and 904.

Figure 11B:
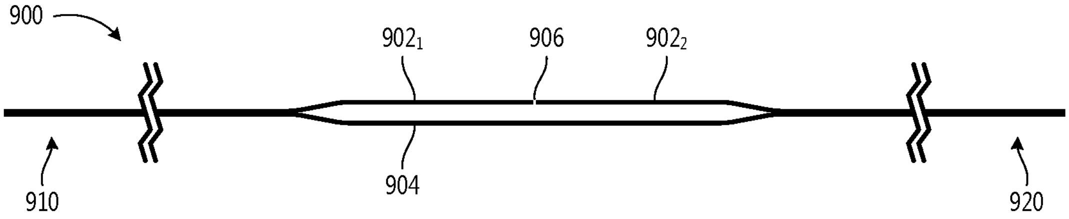

FIG. 11B depicts a cross-sectional side view of an inflatable web 900 formed from the first and second sheets 902 and 904. Between the instance shown in FIG. 11A and the instance shown in FIG. 11B, portions of the first and second sheets 902 and 904 were sealed to each other to form a first inflatable panel 910 and a second inflatable panel 920. In the depicted embodiment, a portion of the first and second sheets 902 and 904 are unsealed between the first and second inflatable panels 910 and 920. In some embodiments, each of the first and second inflatable panels 910 and 920 is sealed in a pattern of inflatable cells that are in fluid communication with the unsealed portions of the first and second sheets 902 and 904 between the first and second inflatable panels 910 and 920 via inflation ports.

As seen in FIG. 11B, the first sheet 902 also has a slit 906 that has been made at some time between the instance shown in FIG. 11A and the instance shown in FIG. 11B. The slit 906 divides the first sheet 902 into a first portion $\mathbf{902}_1$ and a second portion $\mathbf{902}_2$. In some embodiments, the slit 906 can be formed before the sealing of the first and second sheets 902 and 904 to form the first and second inflatable panels 910 and 920, substantially simultaneously with the sealing of the first and second sheets 902 and 904 to form the first and second inflatable panels 910 and 920, or after the sealing of the first and second sheets 902 and 904 to form the first and second inflatable panels 910 and 920. In some embodiments, the slit 906 is substantially centered between the transverse sides of first sheet 902 such that the first portion $\mathbf{902}_1$ and the second portion $\mathbf{902}_2$ have substantially similar lengths.

Figure 11C:
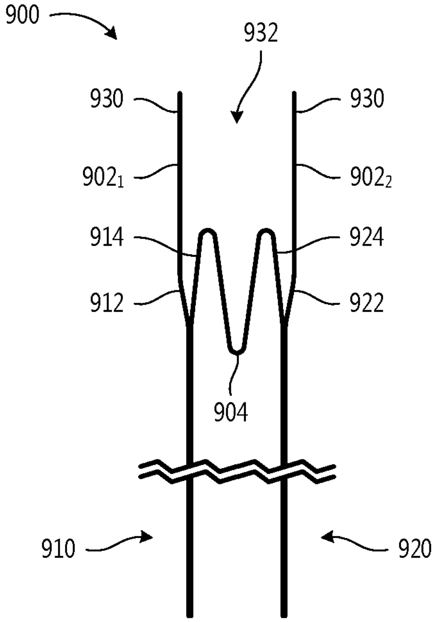

FIG. 11C depicts another cross-sectional side view of the inflatable web 900. Between the instance shown in FIG. 11B and the instance shown in FIG. 11C, the inflatable web 900 has been folded so that the second sheet 904 is located between the first portion $\mathbf{902}_1$ of the first sheet 902 and the second portion $\mathbf{902}_2$ of the first sheet 902. In this configuration, the first portion $\mathbf{902}_1$ of the first sheet 902 and a portion of the second sheet 904 form a sheet 912 and a sheet 914, respectively, of the inflatable panel 910 and the second portion $\mathbf{902}_2$ of the first sheet 902 and a portion of the second sheet 904 form a sheet 922 and a sheet 924, respectively, of the inflatable panel 920. The unsealed areas of the of the sheets 912 and 922 extend above the inflatable panels 910 and 920 to form flanges 930 of the inflatable web 900. An inflation zone 932 of the inflatable web 900 is located between the flanges 930. In the depicted embodiment, the combined lengths of the sheets 912 and 922 is substantially the same as the combined lengths of the sheets 914 and 924. In an effort to ensure that the inflatable panels will properly inflate when a gas is inserted through the inflation zone 932, the portion of the second sheet 904 between the inflatable panels 910 and 920 has been folded back on itself at least once so that the sheets 914 and 924 do not extend as far as the sheets 912 and 922 (i.e., do not extend as far as the flanges 930).

It will be apparent that any of the embodiments of inflatable webs depicted herein can be created using the method depicted in FIGS. 11A to 110. In the case that any of the embodiments of inflatable webs depicted herein are depicted using the method depicted in FIGS. 11A to 110, it will also be apparent that the cross-sectional shape of the inflatable web can be similar to the cross-section shape of the inflatable web 900 depicted in FIG. 11C. The method depicted in FIGS. 11A to 110 may be easier to handle the sheet material when forming inflatable panels because there is no loose sheet material to manage and the sheet material does not need to be folded and/or maintained in a folded configuration before the inflatable panels are formed.

As noted above, it will be understood that variations on the above-described embodiments are possible. For example, the number of inflatable panels that are in fluid communication with an inflation zone can be more than two. In another example, the shapes of the cells of inflatable chambers can be shapes other than the circular or square shapes shown above. In another example, the inflation zone of any inflatable web may be either and open inflation zone or a closed inflation zone. In another example, the lines of weakness in the inflatable web may include three lines of weakness (as shown in the above examples), other numbers of lines of weakness, or no lines of weakness. Any other variation of inflatable webs with an inflation zone and multiple inflatable panels are possible. The ability to form the resulting inflated webs into multiple different forms for different uses, such as those shown in FIGS. 5A-5C, 6A-6B, and 7A-7C, are possible regardless of the variations of the particular embodiment of an inflatable web with multiple inflatable panels and a common inflation zone.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. An inflatable web, comprising:

an inflation zone bound in part by flanges;

a first inflatable panel in fluid communication with the inflation zone, wherein the first inflatable panel includes a first sheet juxtaposed on a second sheet, wherein the first and second sheets are sealed together to form a first plurality of inflatable chambers; and a second inflatable panel in fluid communication with the inflation zone, wherein the second inflatable panel include a third sheet juxtaposed on a fourth sheet, wherein the third and fourth sheets are sealed together to form a second plurality of inflatable chambers;

wherein the inflatable web is configured to be inflated by an inflation and sealing machine configured to direct gas into the first plurality of inflatable chambers and the second plurality of inflatable chambers via the inflation zone and to individually seal the first plurality of inflatable chambers and the second plurality of inflatable chambers.

2. The inflatable web of claim 1, wherein the flanges are connected to each other so that the inflation zone is closed.

3. The inflatable web of claim 1, wherein the flanges are not connected directly to each other so that the inflation zone is open.

4. The inflatable web of claim 1, wherein the first plurality of inflatable chambers includes inflatable chambers each having inflatable cells.

5. The inflatable web of claim 4, wherein the inflatable cells have a shape that is substantially circular.

6. The inflatable web of claim 1, wherein the first plurality of inflatable chambers is fluidly coupled to the inflation zone via first inflation ports, and wherein the second plurality of inflatable chambers is fluidly coupled to the inflation zone via second inflation ports.

7. The inflatable web of claim 6, further comprising:

a first line of weakness in the first inflation panel above the first inflation ports; and a second line of weakness in the second inflation panel above the second inflation ports.

8. The inflatable web of claim 7, wherein, after inflation of the inflatable web, the inflatable web is configured to be broken at the first and second lines of weakness to form two separate inflated panels.

9. The inflatable web of claim 1, wherein the inflatable web includes a third line of weakness between the second sheet of the first inflatable panel and the third sheet of the second inflatable panel.

10. The inflatable web of claim 9, further comprising a seal near longitudinal edges of the first and second inflatable panels.

11. The inflatable web of claim 10, wherein the third line of weakness can be broken to permit an object to be inserted between the first and second inflatable panels above the seal near the longitudinal edges of the first and second inflatable panels.

12. The inflatable web of claim 1, wherein the inflatable web is configured to be wound into a supply roll with the inflation zone on a longitudinal side of the supply roll and the first and second inflatable panels overlapping each other.

13. The inflatable web of claim 12, wherein the first and second inflatable panels, after inflation by the inflation and sealing apparatus, are configured to be unfolded to a width that is greater than a width of the supply roll.

14. The inflatable web of claim 1, wherein the first and second sheets are formed from a single sheet that is folded onto itself between the first and second sheets.

15. The inflatable web of claim 1, wherein the third and fourth sheets are formed from a single sheet that is folded onto itself between the third and fourth sheets.

16. The inflatable web of claim 1, wherein the first, second, third, and fourth sheets are formed from a single sheet folded onto itself multiple times so that a heat sealable surface of the single sheet faces inward between the first and second sheets, the heat sealable surface of the single sheet faces inward between the third and fourth sheets, and an exterior surface of the single sheet faces inward between the second and third sheets.

17. The inflatable web of claim 1, wherein a length of the first sheet is substantially similar to a length of the fourth sheet.

18. The inflatable web of claim 1, wherein a combined length of the first sheet and the fourth sheet is substantially similar to a combined length of the second sheet and the third sheet.

19. The inflatable web of claim 18, wherein the second sheet and the third sheet are formed from a single sheet that is folded back on itself at least once so that the second and third sheets do not extend as far as the first and fourth sheets.

20. The inflatable web of claim 1, wherein:

the first inflatable panel includes a first flap that extends from distal ends of the first plurality of inflatable chambers to a longitudinal edge of the first inflatable panel; and the second inflatable panel includes a second flap that extends from distal ends of the second plurality of inflatable chambers to a longitudinal edge of the second inflatable panel.

21. The inflatable web of claim 20, further comprising:

a closure mechanism configured to couple the first and second flaps to each other.

22. The inflatable web of claim 21, wherein the closure mechanism includes an adhesive layer on an inner side of the first flap, and wherein the adhesive layer is configured to contact and adhere to an outer side of the second layer.

23. The inflatable web of claim 21, wherein:

the inflatable web is configured to be wound into a supply roll with the inflation zone on a first longitudinal side of the supply roll, the first and second inflatable panels overlapping each other, and the closure mechanism on a second longitudinal side of the supply roll; and the first longitudinal side of the supply roll is on one side of the supply roll and the second longitudinal side of the supply roll is on another side of the supply roll.

* * * * *